US006947417B2

(12) United States Patent
Laursen et al.

(10) Patent No.: US 6,947,417 B2
(45) Date of Patent: Sep. 20, 2005

(54) METHOD AND SYSTEM FOR PROVIDING MEDIA SERVICES

(75) Inventors: Arthur I. Laursen, Diablo, CA (US); David Israel, Santa Clara, CA (US); Thomas McKnight, Santa Clara, CA (US)

(73) Assignee: IP Unity, Milpitas, CA (US)

( * ) Notice: Subject to any disclaimer, the term of this patent is extended or adjusted under 35 U.S.C. 154(b) by 141 days.

(21) Appl. No.: 10/122,397

(22) Filed: Apr. 16, 2002

(65) Prior Publication Data

US 2003/0002481 A1 Jan. 2, 2003

Related U.S. Application Data

(63) Continuation of application No. 09/930,500, filed on Aug. 16, 2001, now Pat. No. 6,847,618, which is a continuation-in-part of application No. 09/893,743, filed on Jun. 29, 2001.

(51) Int. Cl.[7] ......................... H04L 12/28; H04L 12/56; H04M 1/64

(52) U.S. Cl. ..................... 370/389; 370/503; 379/88.13

(58) Field of Search ................................ 370/259, 351, 370/352, 354, 356, 503, 486, 389; 379/67.1, 201.01, 219, 221.08, 90.01, 86.13, 88.18; 710/1

(56) References Cited

U.S. PATENT DOCUMENTS

| | | | | |
|---|---|---|---|---|
| 5,436,896 A | | 7/1995 | Anderson et al. | 370/62 |
| 5,983,192 A | | 11/1999 | Botzko et al. | 704/500 |
| 6,118,864 A | | 9/2000 | Chang et al. | 379/225 |
| 6,263,371 B1 | * | 7/2001 | Geagan et al. | 709/231 |
| 6,282,193 B1 | * | 8/2001 | Hluchyj et al. | 370/356 |
| 6,404,745 B1 | | 6/2002 | O'Neil | 370/260 |
| 6,421,338 B1 | * | 7/2002 | Byers et al. | 370/352 |
| 6,466,550 B1 | | 10/2002 | Foster | 370/261 |
| 6,567,419 B1 | * | 5/2003 | Yarlagadda | 370/466 |
| 2001/0030958 A1 | | 10/2001 | Kichise | 370/352 |
| 2002/0075879 A1 | | 6/2002 | Ramey | 370/401 |
| 2002/0103919 A1 | * | 8/2002 | Hannaway | 709/231 |
| 2002/0133247 A1 | * | 9/2002 | Smith et al. | 700/94 |
| 2002/0170067 A1 | * | 11/2002 | Norstrom et al. | 725/109 |
| 2003/0045957 A1 | | 3/2003 | Haberman | 700/94 |
| 2003/0122430 A1 | | 7/2003 | Haberman | 307/64 |

OTHER PUBLICATIONS

Copy of International Search Report for Appl. No. PCT/US02/20359, issued Feb. 4, 2003.

Collins, D., "Carrier Grade Voice Over IP", McGraw–Hill Companies, Inc., New York, NY, 2001 (entire book provided).

Wolter, Charlotte, "Serving the Media—new Type of Product Will Turbocharge Voice, Audio and Video Apps," *Sounding Board—HP Communications Markets and Technology*, posted Apr. 2001.

Michael, Bill, "Network Based Media Servers: The New Generation," *Communications Convergence.com*, Apr. 5, 2001, internet address: http://www.computertelephony.com/article/CTM20010326S0007, Aug. 17, 2001; 5 pages.

* cited by examiner

*Primary Examiner*—Seema S. Rao
*Assistant Examiner*—Kevin C. Harper
(74) *Attorney, Agent, or Firm*—Sterne, Kessler, Goldstein & Fox P.L.L.C.

(57) ABSTRACT

The present invention provides a method and system for providing media services in Voice over IP telephony. A switch is coupled between one or more audio sources and a network interface controller. The switch can be a packet switch or a cell switch.

15 Claims, 27 Drawing Sheets

| SVC | CID | NETWORK ADDRESS (IP/UDP) |
|---|---|---|
| 1 | 1 | |
| 2 | 2 | |
| 3 | 3 | |
| 4 | 4 | |
| | ⋮ | |
| N | N | |

1025

EXAMPLE LOOK-UP TABLE

FIG. 11

METHOD AND SYSTEM FOR PROVIDING MEDIA SERVICES

CROSS-REFERENCE TO RELATED APPLICATION

This application is a continuation of and claims the benefit of priority to "Method and System for Distributed Conference Bridge Processing," application Ser. No. 09/930,500, by A. Laursen, filed on Aug. 16, 2001 now U.S. Pat. No. 6,847,618, which in turn claims the benefit of priority to U.S. non-provisional application, "Method and System for Switching Among Independent Packetized Audio Streams," application Ser. No. 09/893,743, by D. Israel et al., filed on Jun. 29, 2001, both of the application Ser. Nos. 09/930,500 and 09/893,743 are hereby incorporated herein by reference in their entirety.

BACKGROUND OF THE INVENTION

1. Field of the Invention

The invention relates generally to audio communication over a network.

2. Background Art

Audio has long been carried in telephone calls over networks. Traditional circuit-switched time division multiplexing (TDM) networks including public-switched telephone networks (PSTN) and plain old telephone networks (POTS) were used. These circuit-switched networks establish a circuit across the network for each call. Audio is carried in analog and/or digital form across the circuit in real-time.

The emergence of packet-switched networks, such as the local area networks (LANs), and the Internet, now requires that audio be carried digitally in packets. Audio can include but is not limited to voice, music, or other type of audio data. Voice over Internet Protocol systems (also called Voice over IP or VOIP systems) transport the digital audio data belonging to a telephone call in packets over packet-switched networks instead of traditional circuit-switched networks. In one example, a VOIP system forms two or more connections using Transmission Control Protocol/Internet Protocol (TCP/IP) addresses to accomplish a connected telephone call. Devices that connect to a VOIP network must follow standard TCP/IP packet protocols in order to interoperate with other devices within the VOIP network. Examples of such devices are IP phones, integrated access devices, media gateways, and media servers.

A media server is often an endpoint in a VOIP telephone call. The media server is responsible for ingress and egress audio streams, that is, audio streams which enter and leave a media server respectively. The type of audio produced by a media server is controlled by the application that corresponds to the telephone call such as voice mail, conference bridge, interactive voice response (IVR), speech recognition, etc. In many applications, the produced audio is not predictable and must vary based on end user responses. Words, sentences, and whole audio segments such as music must be assembled dynamically in real time as they are played out in audio streams.

Packet-switched networks, however, can impart delay and jitter in a stream of audio carried in a telephone call. A real-time transport protocol (RTP) is often used to control delays, packet loss and latency in an audio stream played out of a media server. The audio stream can be played out using RTP over a network link to a real-time device (such as a telephone) or a non-real-time device (such as an email client in unified messaging). RTP operates on top of a protocol such as the User Datagram Protocol (UDP) which is part of the IP family. RTP packets include among other things a sequence number and a timestamp. The sequence number allows a destination application using RTP to detect the occurrence of lost packets and to ensure a correct order of packets are presented to a user. The timestamp corresponds to the time at which the packet was assembled. The timestamp allows a destination application to ensure synchronized play-out to a destination user and to calculate delay and jitter. See, D. Collins, *Carrier Grade Voice over IP*, Mc-Graw Hill: United States, Copyright 2001, pp. 52–72, the entire book of which is incorporated in its entirety herein by reference.

A media server at an endpoint in a VOIP telephone call uses protocols such as RTP to improve communication quality for a single audio stream. Such media servers, however, have been limited to outputting a single audio stream of RTP packets for a given telephone call.

A conference call links multiple parties over a network in a common call. Conference calls were originally carried out over a circuit-switched network such as a plain old telephone system (POTS) or public switched telephone network (PSTN). Conference calls are now also carried out over packet-switched networks, such as local area networks (LANs) and the Internet. Indeed, the emergence of voice over the Internet systems (also called Voice over IP or VOIP systems) has increased the demand for conference calls over networks.

Conference bridges connect participants in conference calls. Different types of conference bridges have been used depending in part upon the type of network and how voice is carried over the network to the conference bridge. One type of conference bridge is described in U.S. Pat. No. 5,436,896 (see the entire patent). This conference bridge 10 operates in an environment where voice signals are digitally encoded in a 64 Kbps data stream (FIG. 1, col. 1, lns. 21–26).

Conference bridge 10 has a plurality of inputs 12 and outputs 14. Inputs 12 are connected through respective speech detectors 16 and switches 18 to a common summing amplifier 20. Speech detector 16 detects speech by sampling an input data stream and determining the amount of energy present over time. (col. 1, lns. 36–39). Each speech detector 16 controls a switch 18. When no speech is present switch 18 is held open to reduce noise. During a conference call, inputs 12 of all participants who are speaking are coupled through summing amplifier 20 to each of the outputs 14. Subtractors 24 subtract each participant's own voice data stream. A number of participants 1–n then can speak and hear each other in the connections made through conference bridge 10. See, '896 patent, col. 1, ln. 12–col. 2, ln. 16.

Digitized voice is now also being carried in packets over packet-switched networks. The '896 patent describes one example of asynchronous mode transfer (ATM) packets (also called cells). To support a conference call in this networking environment, conference bridge 10 converts input ATM cells to network packets. Digitized voice is extracted from the packets and processed in conference bridge 12 as described above. At the summed output digitized voices are re-converted from network packets back to ATM cells prior to being sent to participants 1–n. See, '896 patent, col. 2, ln. 17–col. 2, ln. 36.

The '896 patent also describes a conference bridge 238 shown in FIGS. 2 and 3 which processes ATM cells without converting and re-converting the ATM cells to network packets as in conference 10. Conference bridge 238 has inputs 302–306, one from each of the participants, and outputs 302–306, one to each of the participants. Speech detectors 314–318 analyze input data aggregated in sample and hold buffers 322–326. Speech detectors 314–318 report the detected speech an/or volume of detected speech to controller 320. See, '896 patent, col. 4, lns. 16–39.

Controller 320 is coupled to a selector 328, gain control 329 and replicator 330. Controller 320 determines which of the participants is speaking based on the outputs of speech detectors 314–318. When one speaker (such as participant 1) is talking, controller 320 sets selector 328 to read data from buffer 322. The data moves through automatic gain control 329 to replicator 330 . Replicator replicates the data in the ATM cell selected by selector 328 for all participants except the speaker. See, '896 patent, col. 4, ln. 40–col. 5, ln. 5. When two or more speakers are speaking, the loudest speaker is selected in a given selection period. The next loudest speaker is then selected in a subsequent selection period. The appearance of simultaneous speech is kept up by scanning speech detectors 314–318 and reconfiguring selector 328 at appropriate interval such as six milliseconds. See, '896 patent, col. 5, lns. 6–65.

Another type of conference bridge is described in U.S. Pat. No. 5,983,192 (see the entire patent). In one embodiment, a conference bridge 12 receives compressed audio packets through a real-time transport protocol (RTP/RTCP). See, '192 patent, col. 3, ln. 66–col. 4, ln. 40. Conference bridge 12 includes audio processors 14_a_–14_d_. Exemplary audio processor 14_c_ associated with a site C (i.e., a participant C) includes a switch 22 and selector 26. Selector 26 includes a speech detector which determines which of other sites A, B, or D has the highest likelihood of speech. See, '192 patent, col. 4, lns. 40–67. Alternatives include selecting more than one site and using an acoustic energy detector. See, '192 patent, col. 5, lns. 1–7. In another embodiment described in the '192 patent, the selector 26/switches 22 output a plurality of loudest speakers in separate streams to local mixing end-point sites. The loudest streams are sent to multiple sites. See, '192 patent, col. 5, lns. 8–67. Configurations of mixer/encoders are also described to handle multiple speakers at the same time, referred to as "double-talk" and "triple-talk." See, '192 patent, col. 7, ln. 20–col. 9, ln. 29.

Voice-over-the-Internet (VOIP) systems continue to require an improved conference bridge. For example, a Softswitch VOIP architecture may use one or more media servers having a media gateway control protocol such as MGCP (RFC 2705). See, D. Collins, *Carrier Grade Voice over IP*, Mc-Graw Hill: United States, Copyright 2001, pp. 234–244, the entire book of which is incorporated in its entirety herein by reference. Such media servers are often used to process audio streams in VOIP calls. These media servers are often endpoints where audio streams are mixed in a conference call. These endpoints are also referred to as "conference bridge access points" since the media server is an endpoint where media streams from multiple callers are mixed and provided again to some or all of the callers. See, D. Collins, p. 242.

As the popularity and demand for IP telephony and VOIP calls increases, media servers are expected to handle conference call processing with carrier grade quality. Conference bridges in a media server need to be able to scale to handle different numbers of participants. Audio in packet streams, such as RTP/RTCP packets, needs to be processed in real-time efficiently.

BRIEF SUMMARY OF THE INVENTION

The present invention provides a method and system for providing media services in Voice over IP telephony. In one embodiment, a switch is coupled between multiple audio sources and a network interface controller. The switch can be a packet switch or a cell switch. Internal and/or external audio sources generate audio streams of packets. Any type of packet can be used. In one embodiment, an internal packet includes a packet header and a payload.

Further embodiments, features, and advantages of the present inventions, as well as the structure and operation of the various embodiments of the present invention, are described in detail below with reference to the accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

In the drawings:

FIG. 6A is diagram of a noiseless switch over system that carries out cell switching of independent egress audio streams generated by internal audio sources according to an embodiment of the present invention.

FIG. 6B is diagram of audio data flow in a noiseless switch over system that carries out cell switching of independent egress audio streams generated by internal audio sources according to an embodiment of the present invention.

FIG. 6C is diagram of a noiseless switch over system that carries out cell switching between independent egress audio streams generated by internal and/or external audio sources according to an embodiment of the present invention.

FIG. 6D is diagram of audio data flow in a noiseless switch over system that carries out cell switching between independent egress audio streams generated by internal and/or external audio sources according to an embodiment of the present invention.

FIG. 6E is diagram of audio data flow in a noiseless switch over system that carries out packet switching between independent egress audio streams generated by internal and/or external audio sources according to an embodiment of the present invention.

FIG. 6F is diagram of a noiseless switch over system that carries out switching between independent egress audio streams generated by external audio sources according to an embodiment of the present invention.

FIG. 11 is an example look-up table used in the distributed conference bridge of FIG. 10.

Figure 1:
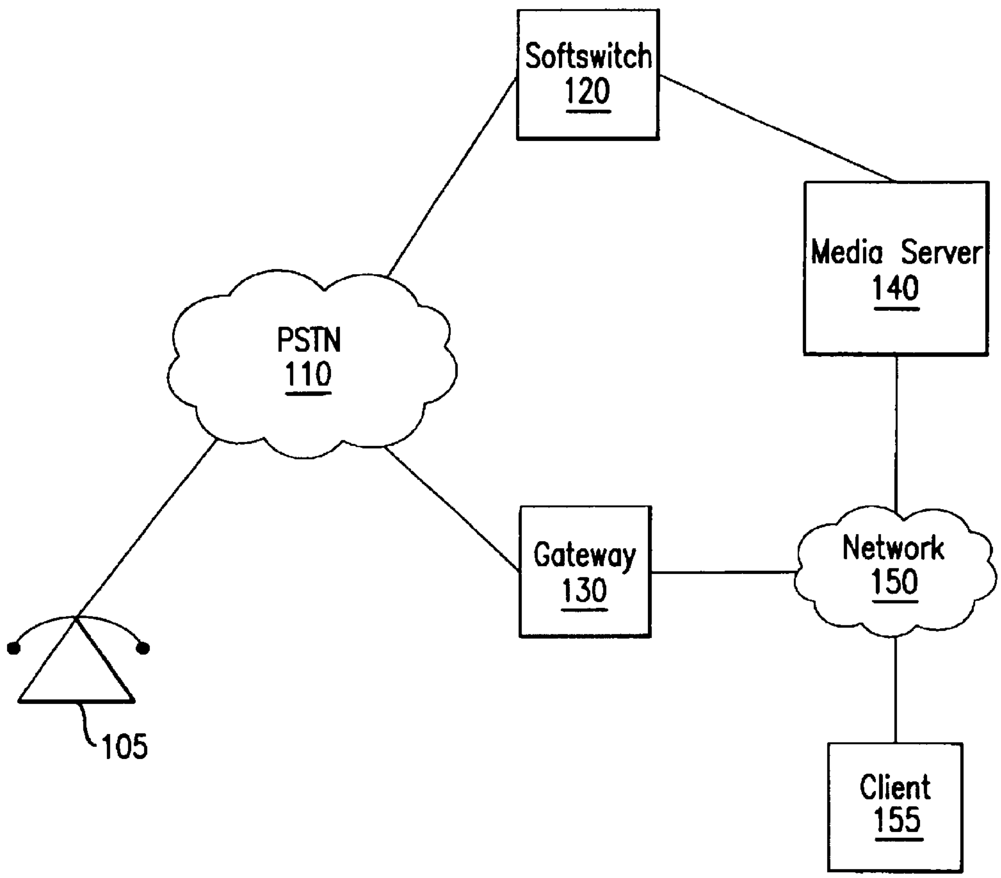
FIG. 1 is a diagram of a media server in a voice over the Internet example environment according to the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Table of Contents

I. Overview and Discussion
II. Terminology
III. Audio Networking Environment
IV. Media Server, Services and Resources
V. Audio Processing Platform with a Packet/Cell Switch for Noiseless Switching of Independent Audio Streams
VI. Example Audio Processing Platform Implementation
VII. Call Control and Audio Feature Manager
VIII. Audio Processing Platform Operation
  A. Ingress Audio Streams
  B. Egress Audio Streams
IX. Noiseless Switching of Egress Audio Streams
  A. Cell Switch—Internal Audio Sources
  B. Packets
    1. IP Packets with RTP information
    2. Internal Egress Packets
  C. Priority Levels
  D. Noiseless Fully Meshed Cell Switch
  E. Two-Stage Egress Switching
  F. Call Event Triggering Noiseless Switch Over
  G. Audio Data Flow
  H. Other Embodiments
X. Conference Call Processing
  A. Distributed Conference Bridge
  B. Distributed Conference Bridge Operation
  C. Outbound Packet Flow through Distributed Conference Bridge
  D. Control Logic and Additional Embodiments
XI. Conclusion I. Overview and Discussion The present invention provides a method and system for distributed conference bridge processing in Voice over IP telephony. Work is distributed away from a mixing device such as a DSP. In particular, a distributed conference bridge according to the present invention uses internal multicasting and packet processing at a network interface to reduce work at an audio mixing device. A conference call agent is used to establish and end a conference call. An audio source such as a DSP mixes audio of active conference call participants. Only one fully mixed audio stream and a set of partially mixed audio streams need to be generated. A switch is coupled between the audio source mixing audio content and a network interface controller. The switch includes a multi-caster. The multi-caster replicates packets in the one fully mixed audio stream and a set of partially mixed audio streams and multi-casts the replicated packets to links (such as SVCs) associated with each call participant. A network interface controller processes each packet to determine whether to discard or forward the packet for the fully mixed or partially mixed audio stream to a participant. This determination can be made in real-time based on a look-up table at the NIC and the packet header information in the multi-casted audio streams.

In one embodiment, a conference bridge according to the present invention is implemented in a media server. According to embodiments of the present invention, the media server can include a call control and audio feature manager for managing the operations of the conference bridge.

The present invention is described in terms of an example voice over the Internet environment. Description in these terms is provided for convenience only. It is not intended that the invention be limited to application in these example environments. In fact, after reading the following description, it will become apparent to a person skilled in the relevant art how to implement the invention in alternative environments known now or developed in the future.

II. Terminology

To more clearly delineate the present invention, an effort is made throughout the specification to adhere to the following term definitions as consistently as possible.

The term noiseless according to the present invention refers to switching between independent audio streams where packet sequence information is preserved. The term synchronized header information refers to packets having headers where packet sequence information is preserved. Packet sequence information can include but is not limited to valid RTP information.

The term digital signal processor (DSP) includes but is not limited to a device used to code or decode digitized voice samples according to a program or application service.

The term digitized voice or voice includes but is not limited to audio byte samples produced in a pulse code modulation (PCM) architecture by a standard telephone circuit compressor/decompressor (CODEC).

The term packet processor refers to any type of packet processor that creates packets for a packet-switched network. In one example, a packet processor is a specialized microprocessor designed to examine and modify Ethernet packets according to a program or application service.

The term packetized voice refers to digitized voice samples carried within a packet.

The term real time protocol (RTP) stream of audio refers to the sequence of RTP packets associated with one channel of packetized voice.

The term switched virtual circuit (SVC) refers to a temporary virtual circuit that is set up and used only as long as data is being transmitted. Once the communication between the two hosts is complete, the SVC disappears. In contrast, a permanent virtual circuit (PVC) remains available at all times.

III. Audio Networking Environment

The present invention can be used in any audio networking environment. Such audio networking environments can include but are not limited to a wide area and/or local area network environment. In example embodiments, the present invention is incorporated within an audio networking environment as a stand-alone unit or as part of a media server, packet router, packet switch or other network component. For brevity, the present invention is described with respect to embodiments incorporated in a media server.

Media servers deliver audio on network links over one or more circuit-switched and/or packet-switched networks to local or remote clients. A client can be any type of device that handles audio including but not limited to a telephone, cellular phone, personal computer, personal data assistant (PDA), set-top box, console, or audio player. FIG. 1 is a diagram of a media server 140 in an voice over the Internet example environment according to the present invention. This example includes a telephone client 105, public-switched telephone network (PSTN) 110, softswitch 120, gateway 130, media server 140, packet-switched network(s) 150, and computer client 155. Telephone client 105 is any type of phone (wired or wireless) that can send and receive audio over PSTN 110. PSTN 110 is any type of circuit-switched network(s). Computer client 155 can be a personal computer.

Telephone client 105 is coupled through a public-switched telephone network (PSTN) 110, gateway 130 and network 150 to media server 140. In this example, call signaling and control is separated from the media paths or links that carry audio. Softswitch 120 is provided between PSTN 110 and media server 140. Softswitch 120 supports call signaling and control to establish and remove voice calls between telephone client 105 and media server 140. In one example, softswitch 120 follows the Session Initiation Protocol (SIP). Gateway 130 is responsible for converting audio passing to and from PSTN 110 and network 150. This can include a variety of well-known functions such as translating a circuit-switched telephone number to an Internet Protocol (IP) address and vice versa.

Computer client 155 is coupled over network 150 to media server 140. A media gateway controller (not shown) can also use SIP to support call signaling and control to establish and breakdown links such as voice calls between computer client 155 and media server 140. An application server (not shown) can also be coupled to media server 140 to support VOIP services and applications.

The present invention is described in terms of these example environments. Description in these terms is provided for convenience only. It is not intended that the invention be limited to application in these example environments involving a media server, router, switch, network component, or stand-alone unit within a network. In fact, after reading the following description, it will become apparent to a person skilled in the relevant art how to implement the invention in alternative environments known now or developed in the future.

IV. Media Server, Services and Resources

Figure 2:
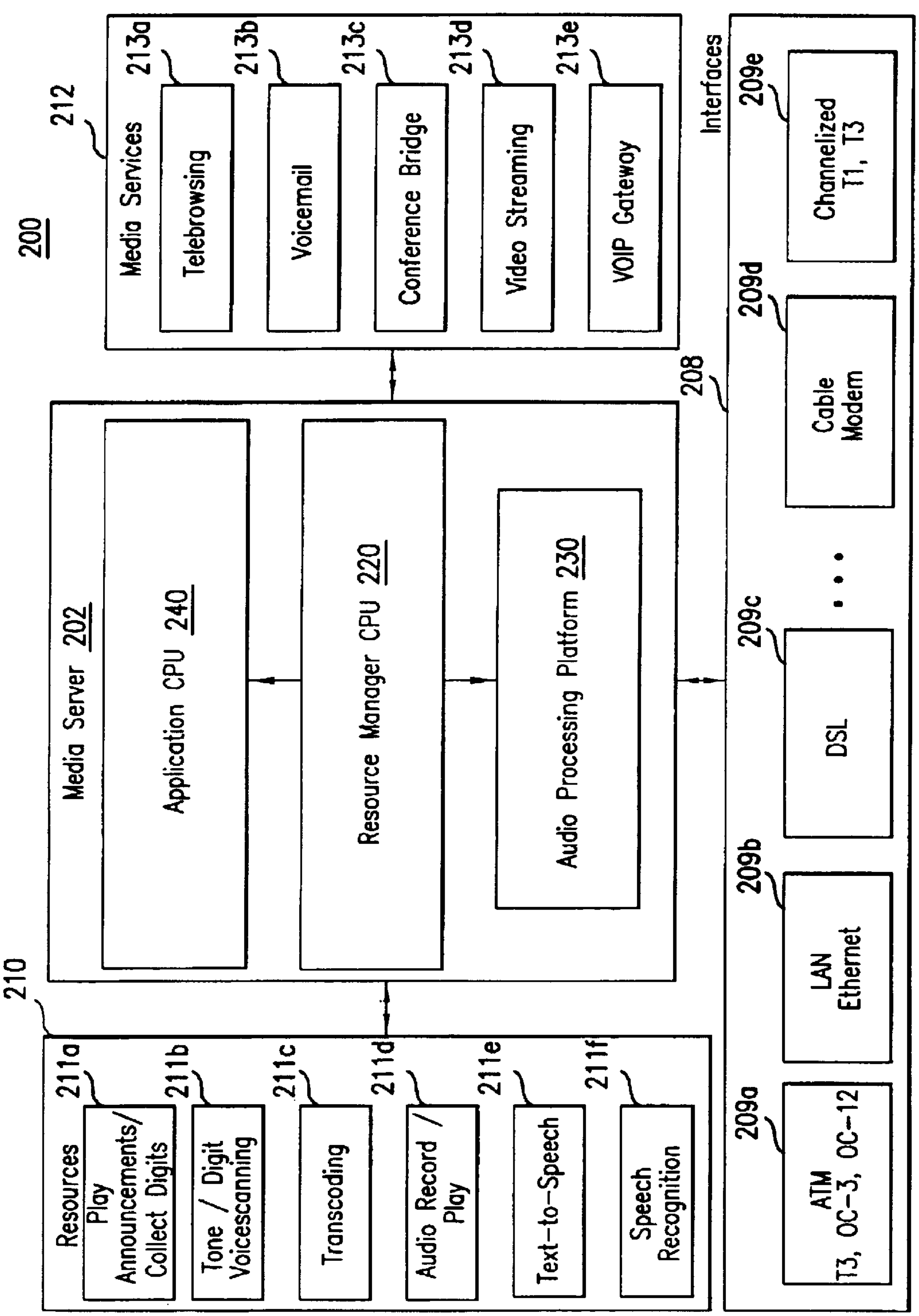
FIG. 2 is a diagram of an example media server including media services and resources according to the present invention.

FIG. 2 is a diagram of an example media platform 200 according to one embodiment the present invention. Platform 200 provides scalable VOIP telephony. Media platform 200 includes a media server 202 coupled to resource(s) 210, media service(s) 212, and interface(s) 208. Media server 202 provides resources 210 and services 212. Resources 210 include, but are not limited to modules 211*a–f*, as shown in FIG 2. Resource modules 211*a–f* include conventional resources such as play announcements/collect digits IVR resources 211*a*, tone/digit voice scanning resource 211*b*, transcoding resource 211*c*, audio record/play resource 211*d*, text-to-speech resource 211*e*, and speech recognition resource 211*f*. Media services 212 include, but are not limited to, modules 213*a–e*, as shown in FIG. 2. Media services modules 213*a–e* include conventional services such as telebrowsing 213*a*, voice mail service 213*b*, conference bridge service 213*c*, video streaming 213*d*, and a VOIP gateway 213*e*.

Media server 202 includes an application central processing unit (CPU) 240 a resource manager CPU 220, and an audio processing platform 230. Application CPU 240 is any processor that supports and executes program interfaces for applications and applets. Application CPU 240 enables platform 200 to provide one or more of the media services 212. Resource manager CPU 220 is any processor that controls connectivity between resources 210 and the application CPU 210 and/or audio processing platform 230. Audio processing platform 230 provides communications connectivity with one or more of the network interfaces 208. Media platform 200 through audio processing platform 230 receives and transmits information via network interface 208. Interface 208 can include, but it not limited to, Asynchronous Transfer Mode (ATM) 209*a*, local area network (LAN) Ethernet 209*b*, digital subscriber line (DSL) 209*c*, cable modem 209*d*, and channelized T1–T3 lines 209*e*.

Figure 3A:
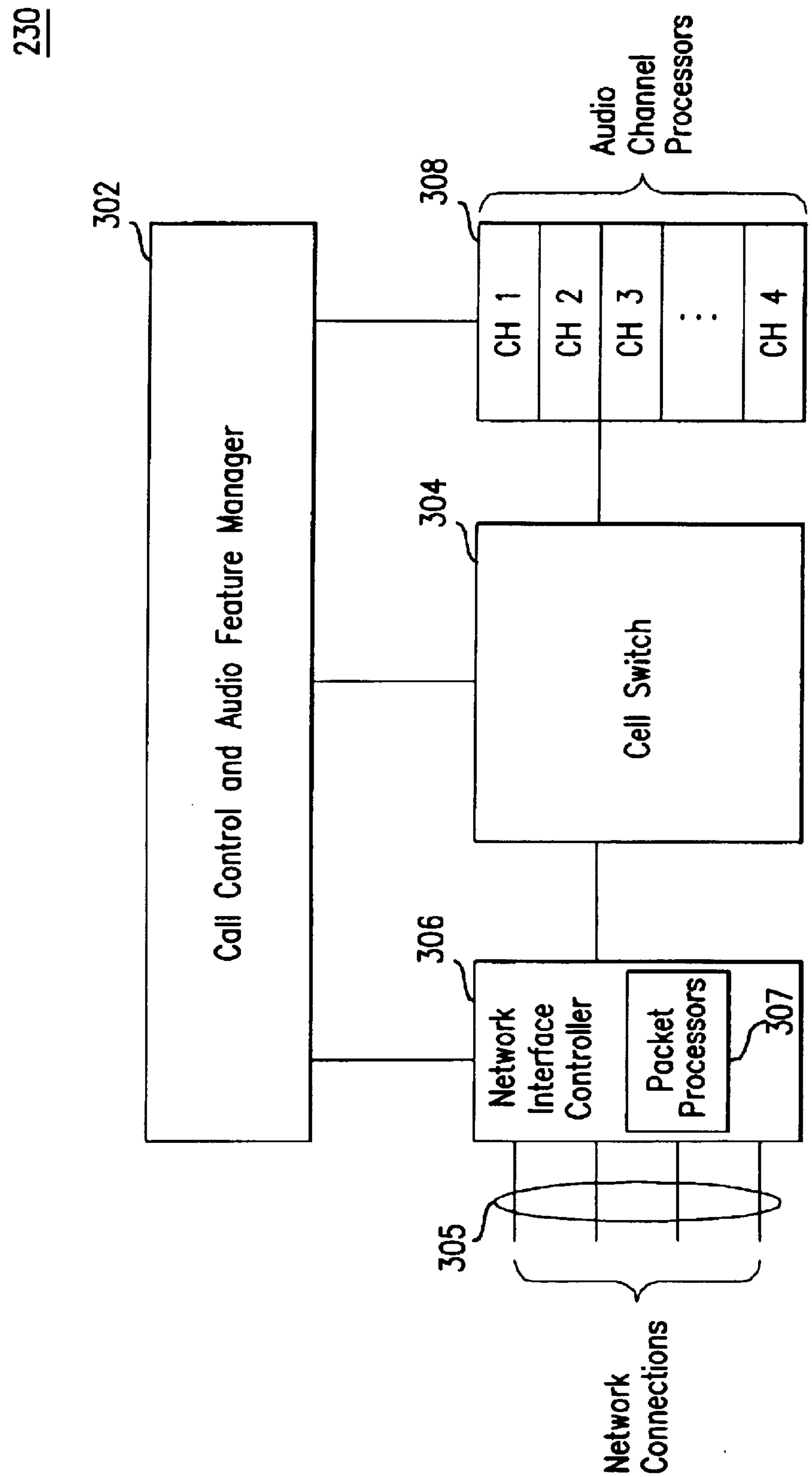
FIGS. 3A and 3B are diagrams of an audio processing platform according to an embodiment of the present invention.

V. Audio Processing Platform with a Packet/Cell Switch for Noiseless Switching of Independent Audio Streams In one embodiment of the present invention, audio processing platform 230 includes a dynamic fully-meshed cell switch 304 and other components for the reception and processing of packets, such as Internet Protocol (IP) packets. Platform 230 is shown in FIG. 3A with regard to audio processing including noiseless switching according to the present invention.

As illustrated, audio processing platform 230 includes a call control and audio feature manager 302, cell switch 304 (also referred to as a packet/cell switch to indicate cell switch 304 can be a cell switch or packet switch), network connections 305, network interface controller 306, and audio channel processors 308. Network interface controller 306 further includes packet processors 307. Call control and audio feature manager 302 is coupled to cell switch 304, network interface controller 306, and audio channels processors 308. In one configuration, call control and audio feature manager 302 is connected directly to the network interface controller 306. Network interface controller 306 then controls packet processor 307 operation based on the control commands sent by call control and audio feature manager 302.

In one embodiment, call control and audio feature manager 302 controls cell switch 304, network interface controller 306 (including packet processors 307), and audio channel processors 308 to provide noiseless switching of independent audio streams according to the present invention. This noiseless switching is described further below with respect to FIGS. 6–9. An embodiment of the call control and audio feature manager 302 according to the present invention is described further below with respect to FIG. 3B.

Network connections 305 are coupled to packet processors 307. Packet processors 307 are also coupled to cell switch 304. Cell switch 304 is coupled in turn to audio channel processors 308. In one embodiment, audio channel processors 308 include four channels capable of handling four calls, i.e., there are four audio processing sections. In alternative embodiments, there are more or less audio channel processors 308.

Data packets, such as IP packets, that include payloads having audio data arrive at network connections 305. In one embodiment, packet processors 307 comprise one or more or eight 100 Base-TX full-duplex Ethernet links capable of high speed network traffic in the realm of 300,000 packets per second per link. In another embodiment, packet processors 307 are capable of 1,000 G.711 voice ports per link and/or 8,000 G.711 voice channels per system.

In additional embodiments, packet processors 307 recognize the IP headers of packets and handle all RTP routing decisions with a minimum of packet delay or jitter.

In one embodiment of the present invention, packet/cell switch 304 is a non-blocking switch with 2.5 Gbps of total bandwidth. In another embodiment, the packet/cell switch 304 has 5 Gbps of total bandwidth.

In one embodiment, the audio channel processors 308 comprise any audio source, such as digital signal processors, as described in further detail with regards to FIG. 4. The audio channel processors 308 can perform audio related services including one or more of the services 211*a–f*.

VI. Example Audio Processing Platform Implementation

Figure 4A:
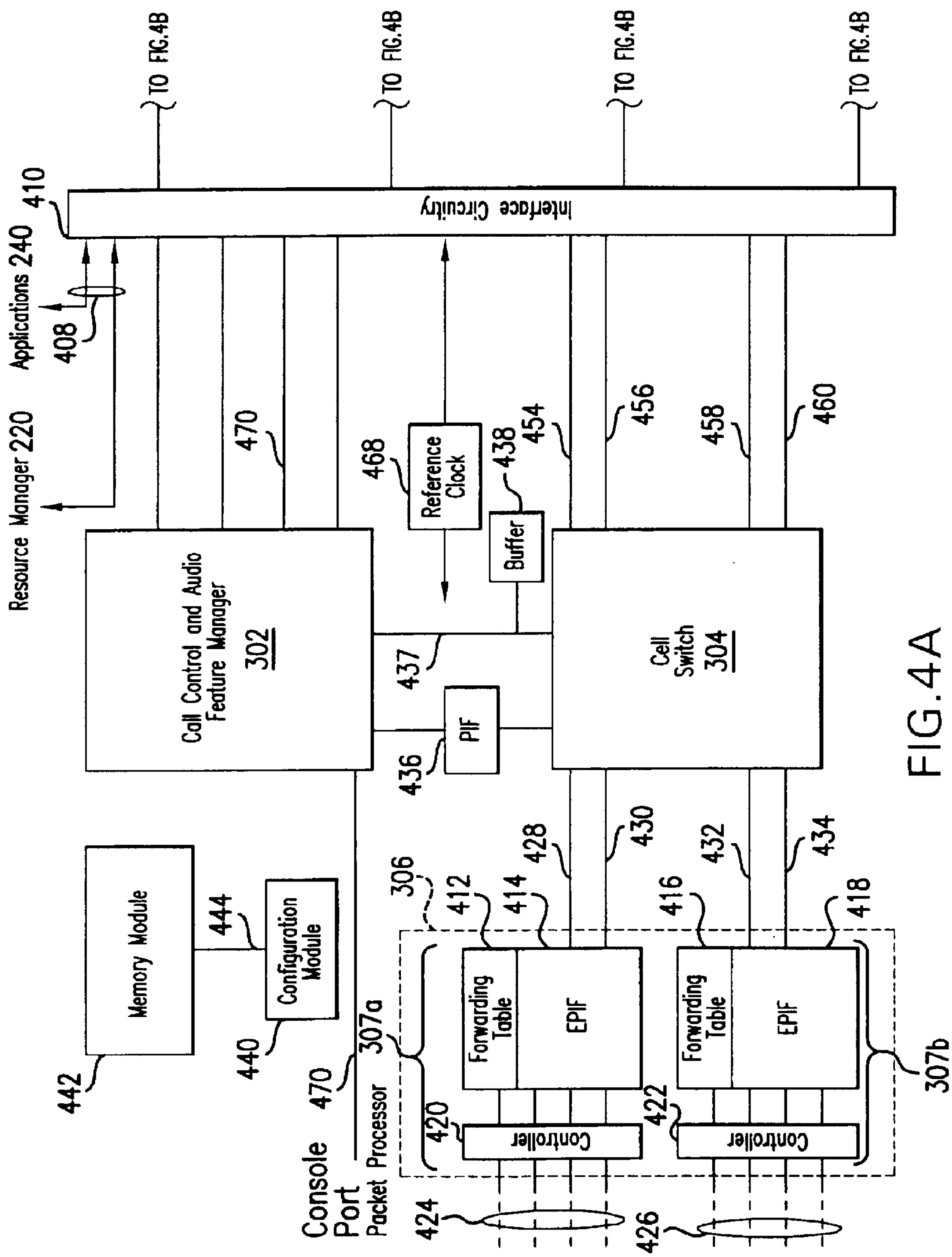
FIGS. 4A and 4B are diagrams of an audio processing platform as shown in FIG. 3 according to an example implementation of the present invention.
Figure 4B:
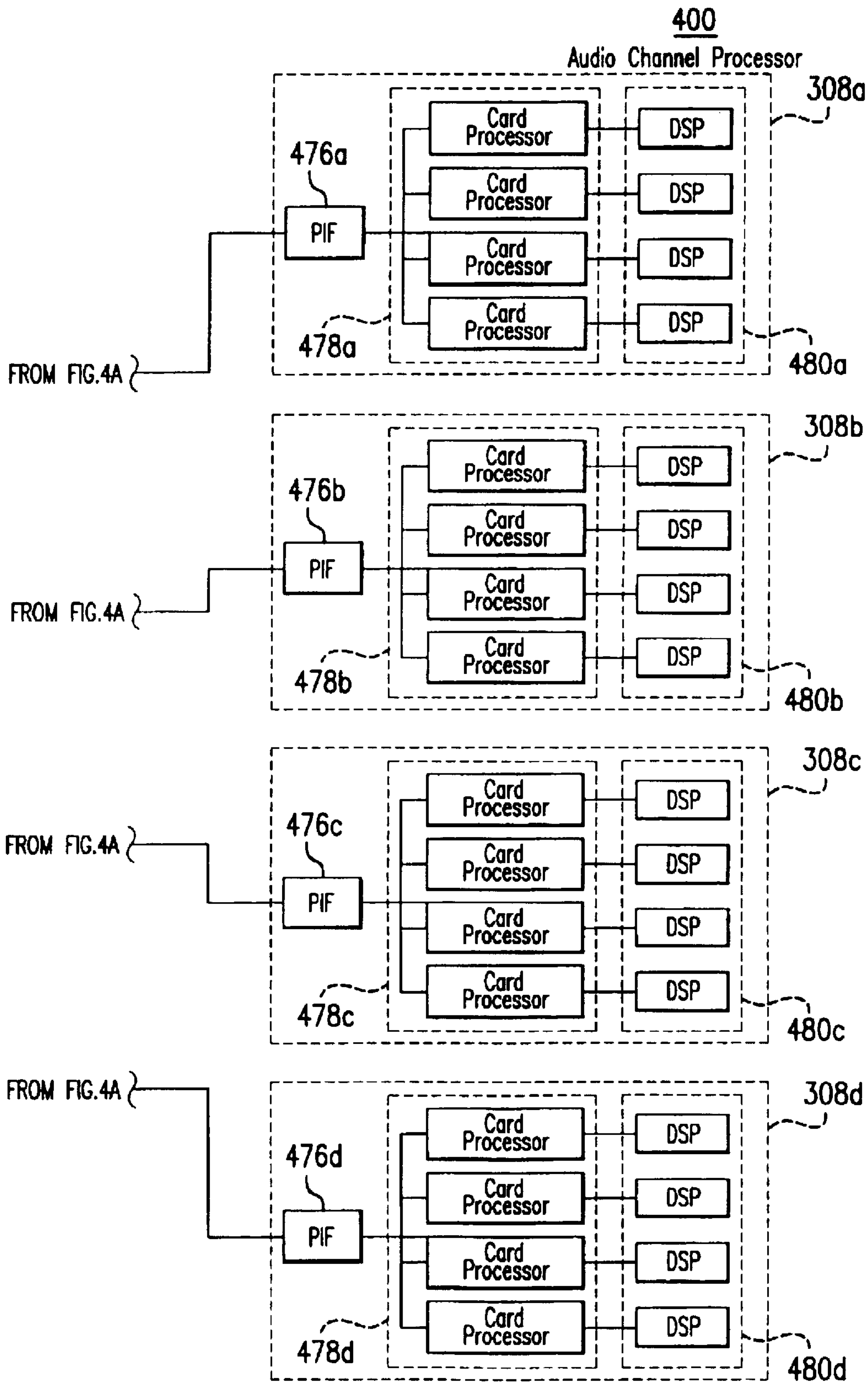

FIGS. 4A and 4B show one example implementation which is illustrative and not intended to limit the present invention. As shown in FIGS. 4A and 4B, audio processing platform 230 can be a shelf controller card (SCC). System 400 embodies one such SCC. System 400 includes cell switch 304, call control and audio feature manager 302, a network interface controller 306, interface circuitry 410, and audio channel processors 308*a–d*.

More specifically, system 400 receives packets at network connections 424 and 426. Network connections 424 and 426 are coupled to network interface controller 306. Network interface controller 306 includes packet processors 307*a–b*. Packet processors 307*a–b* comprise controllers 420, 422, forwarding tables 412, 416, and forwarding processor (EPIF) 414, 418. As shown in FIG. 4A, packet processor 307*a* is coupled to network connection 424. Network connection 424 is coupled to controller 420. Controller 420 is coupled to both forwarding table 412 and EPIF 414. Packet processor 307*b* is coupled to network connection 426. Network connection 426 is coupled to controller 422. Controller 422 is coupled to both forwarding table 416 and EPIF 418.

In one embodiment, packet processors 307 can be implemented on one or more LAN daughtercard modules. In another embodiment, each network connection 424 and 426 can be a 100 Base-TX or 1000 Base-T link.

The IP packets received by the packet processors 307 are processed into internal packets. When a cell layer is used, the internal packets are then converted to cells (such as ATM cells by a conventional segmentation and reassembly (SAR) module). The cells are forwarded by packet processors 307 to cell switch 304. The packet processors 307 are coupled to the cell switch 304 via cell buses 428, 430, 432, 434. Cell switch 304 forwards the cells to interface circuitry 410 via cell buses 454,456,458,460. Cell switch 304 analyzes each of the cells and forwards each of the cells to the proper cell bus of cell buses 454, 456, 458, 460 based on an audio channel for which that cell is destined. Cell switch 304 is a dynamic, fully-meshed switch.

In one embodiment, interface circuitry 410 is a backplane connector.

The resources and services available for the processing and switching of the packets and cells in system 400 are provided by call control and audio feature manager 302. Call control and audio feature manager 302 is coupled to cell switch 304 via a processor interface (PIF) 436, a SAR, and a local bus 437. Local bus 437 is further coupled to a buffer 438. Buffer 438 stores and queues instructions between the call control and audio feature manager 302 and the cell switch 304.

Call control and audio feature manager 302 is also coupled to a memory module 442 and a configuration module 440 via bus connection 444. In one embodiment, configuration module 440 provides control logic for the boot-up, initial diagnostic, and operational parameters of call control and audio feature manager 302. In one embodiment, memory module 442 comprises dual in-line memory modules (DIMMs) for random access memory (RAM) operations of call control and audio feature manager 302.

Call control and audio feature manager 302 is further coupled to interface circuitry 410. A network conduit 408 couples resource manager CPU 220 and/or application CPU 240 to the interface circuitry 410. In one embodiment, call control and audio feature manager 302 monitors the status of the interface circuitry 410 and additional components coupled to the interface circuitry 410. In another embodiment, call control and audio feature manager 302 controls the operations of the components coupled to the interface circuitry 410 in order to provide the resources 210 and services 212 of platform 200.

A console port 470 is also coupled to call control and audio feature manager 302. Console port 470 provides direct access to the operations of call control and audio feature manager 302. For example, one could administer the operations, re-boot the media processor, or otherwise affect the performance of call control and audio feature manager 302 and thus the system 400 using the console port 470.

Reference clock 468 is coupled to interface circuitry 410 and other components of the system 400 to provide consistent means of time-stamping the packets, cells and instructions of the system 400.

Interface circuitry 410 is coupled to each of audio channel processors 308*a*–308*d*. Each of the processors 308 comprise a PIF 476, a group 478 of one or more card processors (also referred to as "bank" processors), and a group 480 of one or more digital signal processors (DSP) and SDRAM buffers. In one embodiment, there are four card processors in group 478 and 32 DSPs in group 480. In such an embodiment, each card processor of group 478 would access and operate with eight DSPs of group 480.

VII. Call Control and Audio Feature Manager

Figure 3B:
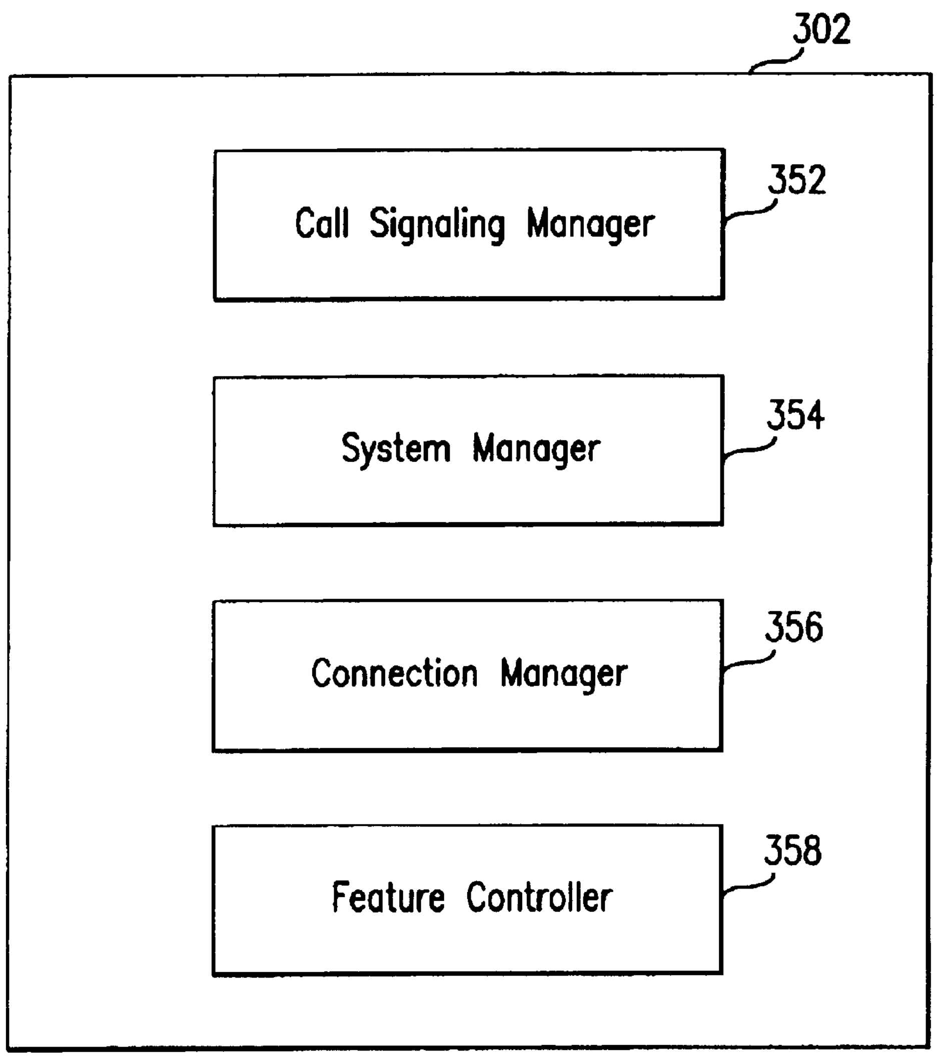

FIG. 3B is a block diagram of call control and audio feature manager 302 according to one embodiment of the present invention. Call control and audio feature manager 302 is illustrated functionally as processor 302. Processor 302 comprises a call signaling manager 352, system manager 354, connection manager 356, and feature controller 358.

Call signaling manager 352 manages call signaling operation such as call establishment and removal, interface with a softswitch, and handling signaling protocols like SIP.

System manager 354 performs bootstrap and diagnostic operations on the components of system 230. System manager 354 further monitors the system 230 and controls various hot-swapping and redundant operation.

Connection manager 356 manages EPIF forwarding tables, such as tables 412 and 416, and provides the routing protocols (such as Routing Information Protocol (RIP), Open Shortest Path First (OSPF), and the like). Further, the connection manager 356 establishes internal ATM permanent virtual circuits (PVC) and/or SVC. In one embodiment, the connection manager 356 establishes bi-directional connections between the network connections, such as network connections 424 and 426, and the DSP channels, such as DSPs 480*a–d*, so that data flows can be sources or processed by a DSP or other type of channel processor.

In another embodiment, connection manager 356 abstracts the details of the EPIF and ATM hardware. Call signaling manager 352 and the resource manager CPU 220 can access these details so that their operations are based on the proper service set and performance parameters.

Feature controller 358 provides communication interfaces and protocols such as, H.323, and MGCP (Media Gateway Control Protocol).

In one embodiment, card processors 478*a–d* function as controllers with local managers for the handling of instructions from the call control and audio feature manager 302 and any of its modules: call signaling manager 352, system manager 354, connection manager 356, and feature controller 358. Card processors 478*a–d* then manage the DSP banks, network interfaces and media streams, such as audio streams.

In one embodiment, the DSPs 480*a–d* provide the resources 210 and services 212 of platform 200.

In one embodiment, call control and audio feature manager 302 of the present invention exercises control over the EPIF of the present invention through the use of applets. In such an embodiment, the commands for configuring parameters (such as port MAC address, port IP address, and the like), search table management, statistics uploading, and the like, are indirectly issued through applets.

The EPIF provides a search engine to handle the functionality related to creating, deleting and searching entries. Since the platform 200 operates on the source and destination of packets, the EPIF provides search functionality of sources and destinations. The sources and destinations of packets are stored in search tables for incoming (ingress) and outgoing (egress) addresses. The EPIF can also manage RTP header information and evaluating relative priorities of egress audio streams to be transmitted as described in further detail below.

VII. Audio Processing Platform Operation

Figure 5A:
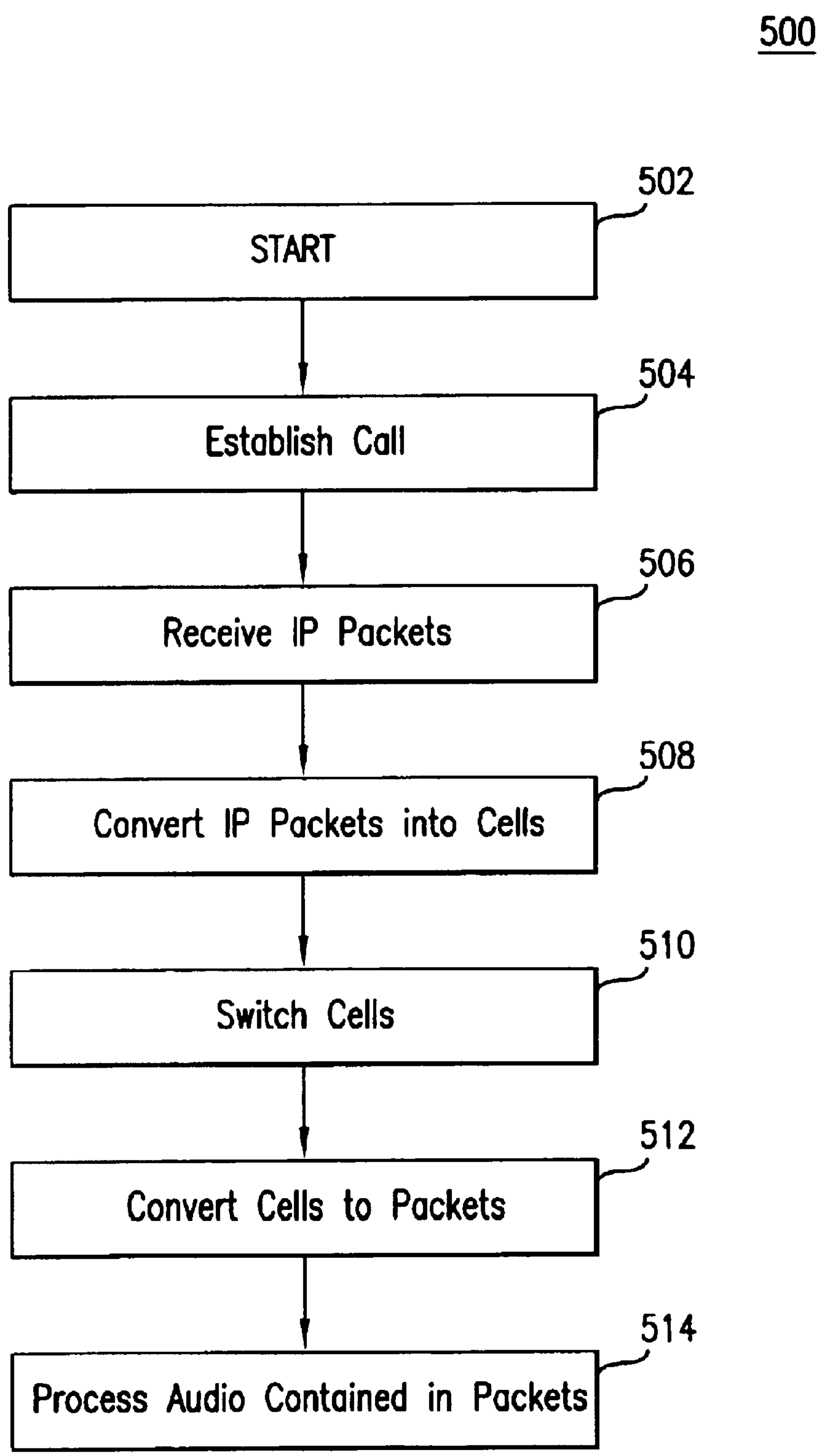
FIG. 5A is a flow diagram showing the establishment of a call and ingress packet processing according to an embodiment of the present invention.
Figure 5B:
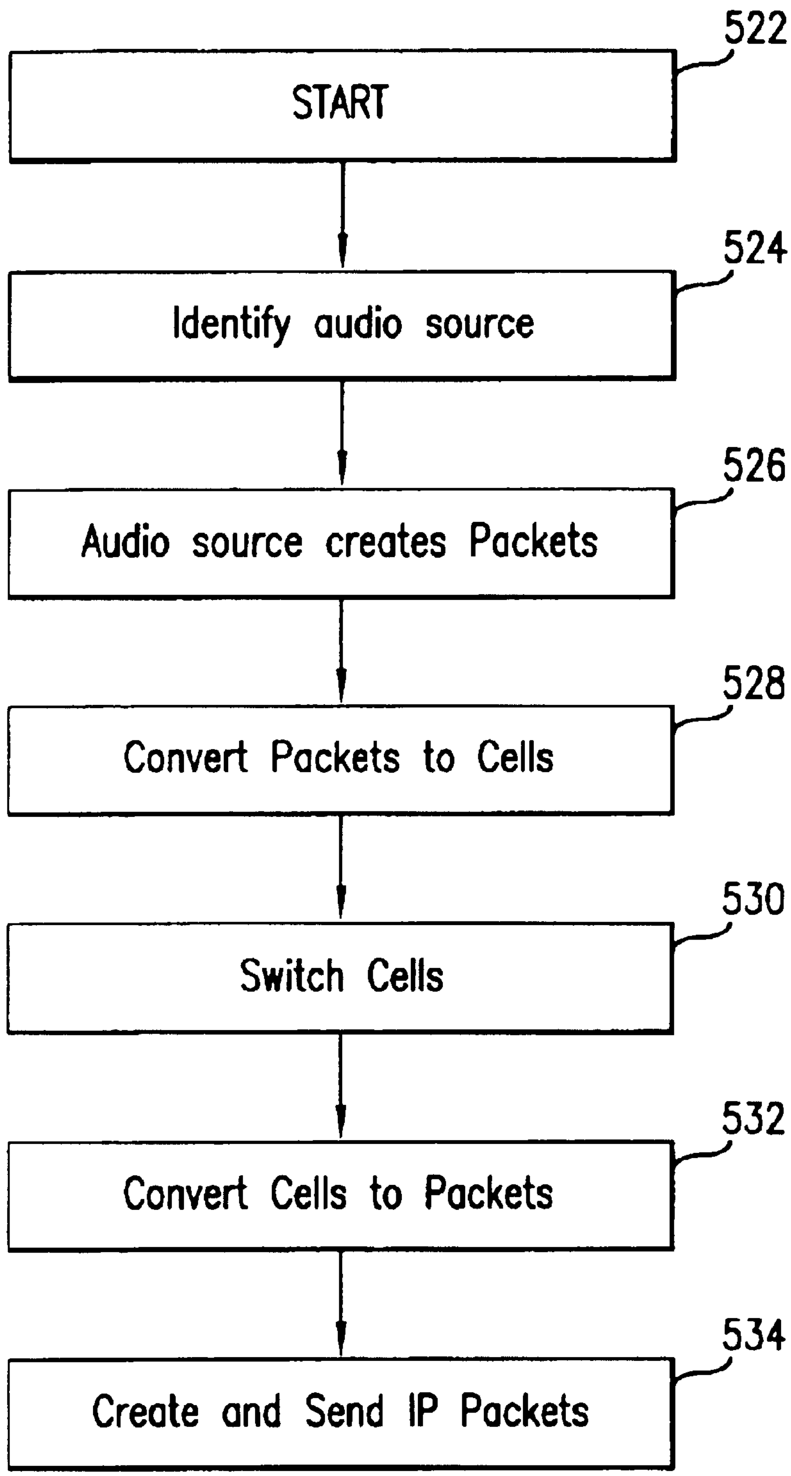
FIG. 5B is a flow diagram showing egress packet processing and call completion according to an embodiment of the present invention.

The operation of audio processing platform 230 is illustrated in the flow diagrams of FIGS. 5A and 5B. FIG. 5A is a flow diagram showing the establishment of a call and ingress packet processing according to an embodiment of the present invention. FIG. 5B is a flow diagram showing egress packet processing and call completion according to an embodiment of the present invention.

A. Ingress Audio Streams

In FIG. 5A, the process for an ingress (also called inbound) audio stream starts at step 502 and immediately proceeds to step 504.

In step 504, call control and audio feature manager 302 establishes a call with a client communicating via the network connections 305. In one embodiment, call control and audio feature manager 302 negotiates and authorizes access to the client. Once client access is authorized, call control and audio feature manager 302 provides IP and UDP address information for the call to the client. Once the call is established, the process immediately proceeds to step 506.

In step 506, packet processors 307 receive IP packets carrying audio via the network connections 305. Any type of packet can be used including but not limited to IP packets, such as Appletalk, IPX, or other type of Ethernet packets. Once a packet is received, the process proceeds to step 508.

In step 508, packet processors 307 check IP and UDP header address in search table to find associated SVC, and then convert the VOIP packets into internal packets. Such internal packets for example can be made up of a payload and control header as described further below with respect to FIG. 7B. Packet processors 307 then construct packets using at least some of the data and routing information and assign a switched virtual circuit (SVC). The SVC is associated with one of the audio channel processors 308, and in particular with one of respective DSP that will process the audio payload.

When a cell layer is used, internal packets are further converted or merged into cells, such as ATM cells. In this way, audio payloads in the internal packets are converted to audio payloads in a stream of one or more ATM cells. A conventional segmentation and reassembly (SAR) module can be used to convert internal packets to ATM cells. Once the packets are converted into the cells, the process proceeds to step 510.

In step 510, cell switch 304 switches the cells to the proper audio channel of the audio channel processors 308 based on the SVC. The process proceeds to step 512.

In step 512, audio channel processors 308 convert the cells into packets. Audio payloads in the arriving ATM cells for each channel are converted to audio payloads in a stream of one or more packets. A conventional SAR module can be used to convert ATM cells to packets. Packets can be internal egress packets or IP packets with audio payloads. Once the cells are converted into the internal packets, the process proceeds to step 514.

In step 514, audio channel processors 308 process the audio data of the packets in the respective audio channels. In one embodiment, the audio channels are related to one or more of the media services 213*a–e*. For example, these media services can be telebrowsing, voice mail, conference bridging (also called conference calling), video streaming, VOIP gateway services, telephony, or any other media service for audio content.

B. Egress Audio Streams

In FIG. 5B, the process for an egress (also called outbound) audio stream starts at step 522 and immediately proceeds to step 524.

In step 524, call control and audio feature manager 302 identifies an audio source for noiseless switch over. This audio source can be associated with an established call or other media service. Once the audio source is identified, the process immediately proceeds to step 526.

In step 526, an audio source creates packets. In one embodiment, a DSP in audio channel processor 308 is an audio source. Audio data can be stored in a SDRAM associated with the DSP. This audio data is then packetized by a DSP into packets. Any type of packet can be used including but not limited to internal packets or IP packets, such as Ethernet packets. In one preferred embodiment, the packets are internal egress packets generated as described with respect to FIG. 7B.

In step 528, an audio channel processor 308 converts the packets into cells, such as ATM cells. Audio payloads in the packets are converted to audio payloads in a stream of one or more ATM cells. In brief, the packets are parsed and the data and routing information analyzed. Audio channel processor 308 then construct cells using at least some of the data and routing information and assigns a switched virtual circuit (SVC). A conventional SAR module can be used to convert packets to ATM cells. The SVC is associated with one of the audio channel processors 308, and in particular with a circuit connecting the respective DSP of the audio source and a destination port 305 of NIC 306. Once the packets are converted into the cells, the process proceeds to step 530.

In step 530, cell switch 304 switches the cells of an audio channel of the audio channel processors 308 to a destination network connection 305 based on the SVC. The process proceeds to step 532.

In step 532, packet processors 307 convert the cells into IP packets. Audio payloads in the arriving ATM cells for each channel are converted to audio payloads in a stream of one or more internal packets. A conventional SAR module can be used to convert ATM cells to internal packets. Any type of packet can be used including but not limited to IP packets, such as Ethernet packets. Once the cells are converted into the packets, the process proceeds to step 534.

In step 534, each packet processor 307 further adds RTP, IP, and UDP header information. A search table is checked to find IP and UDP header address information associated with the SVC. IP packets are then sent carrying audio via the network connections 305 over a network to a destination device (phone, computer, palm device, PDA, etc.). Packet processors 307 process the audio data of the packets in the respective audio channels. In one embodiment, the audio channels are related to one or more of the media services 213*a–e*. For example, these media services can be telebrowsing, voice mail, conference bridging (also called conference calling), video streaming, VOIP gateway services, telephony, or any other media service for audio content.

IX. Noiseless Switching of Egress Audio Streams

According to the one aspect of the present invention, audio processing platform 230 noiselessly switches between independent egress audio streams. Audio processing platform 230 is illustrative. The present invention as it relates to noiseless switching of egress audio stream can be used in any media server, router, switch, or audio processor and is not intended to be limited to audio processing platform 230.

A. Cell Switch—Internal Audio Sources

Figure 6A:
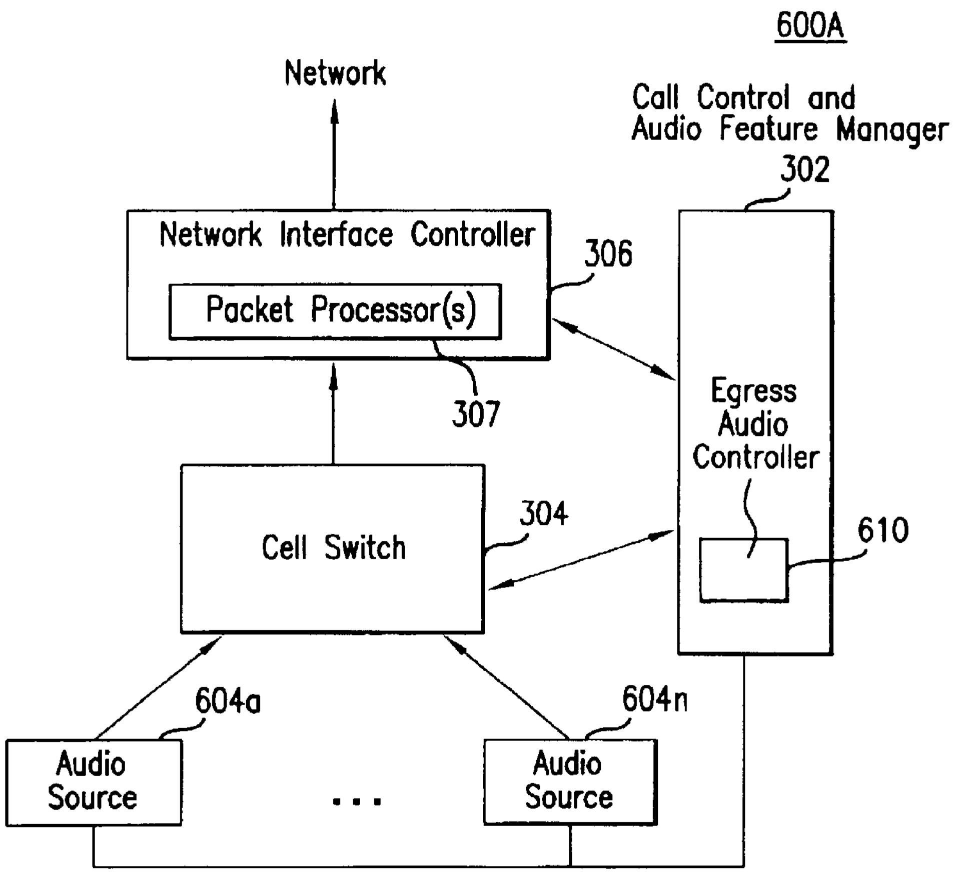
FIGS. 6A–6F are diagrams of noiseless switch over systems according to embodiments of the present invention.

FIG. 6A is diagram of a noiseless switch over system that carries out cell switching of independent egress audio streams generated by internal audio sources according to an embodiment of the present invention. FIG. 6A shows an embodiment of a system 600A for egress audio stream switching from internal audio sources. System 600A includes components of audio processing platform 230 configured for an egress audio stream switching mode of operation. In particular, as shown in FIG. 6A, system 600A includes call control and audio feature controller 302 coupled to a number n of internal audio sources 604*n*, cell switch 304, and network interface controller 306. Internal audio sources 604*a*–604*n* can be two or more audio sources. Any type of audio source can be used including but not limited to DSPs. In one example, DSPs 480 can be audio sources. To generate audio, audio sources 604 can either create audio internally and/or convert audio received from external sources.

Call control and audio feature controller 302 further includes an egress audio controller 610. Egress audio controller 610 is control logic that issues control signals to audio sources 604*n*, cell switch 304, and/or network interface controller 306 to carry out noiseless switching between independent egress audio streams according to the present invention. The control logic can implemented in software, firmware, microcode, hardware or any combination thereof.

A cell layer including SARs 630, 632, 634 is also provided. SARs 630, 632 are coupled between cell switch 304 and each audio source 604*a–n*. SAR 634 is coupled between cell switch 304 and NIC 306.

Figure 7A:
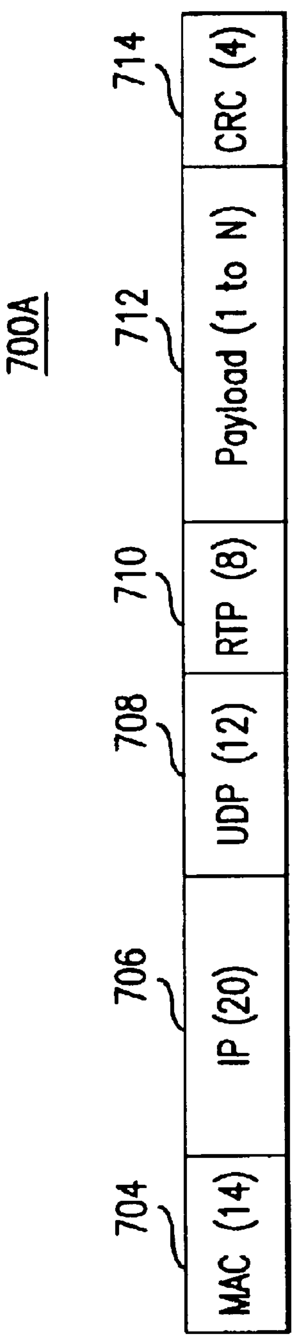
FIG. 7A is a schematic illustration of an IP packet with RTP information.
Figure 7B:
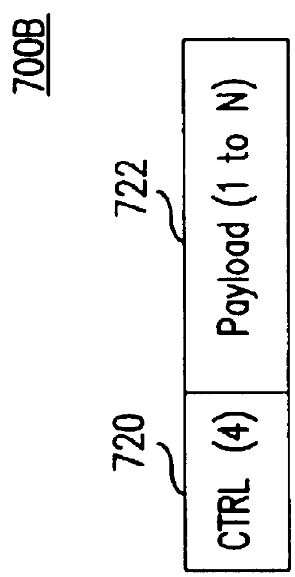
FIG. 7B is a schematic illustration of an internal packet according to one embodiment of the present invention.
Figure 8:
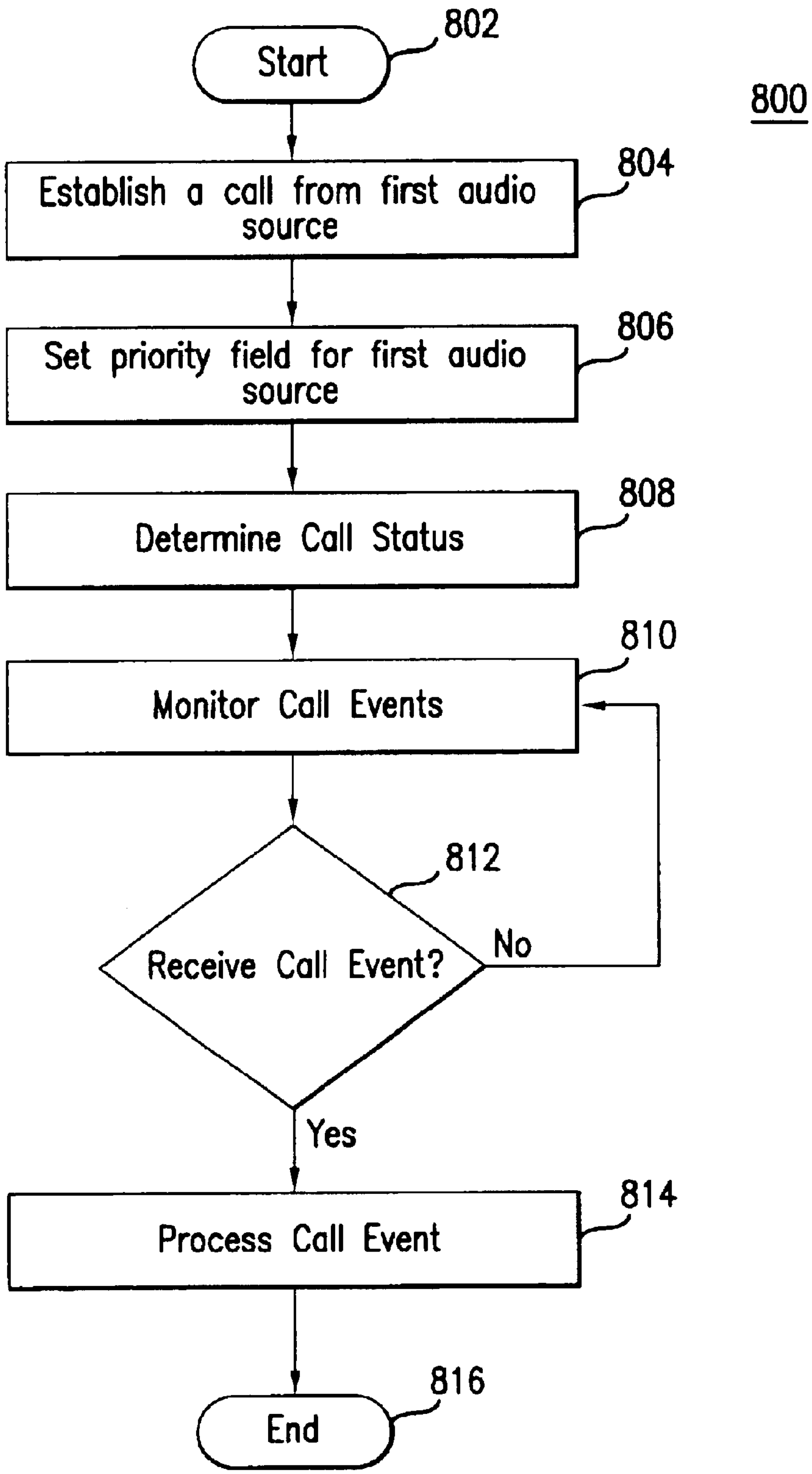
FIG. 8 is a flow diagram showing the switching functionality according to one embodiment of the present invention.

In one embodiment, independent egress audio streams involve streams of IP packets with RTP information and internal egress packets. Accordingly, it is helpful to first describe IP packets and internal egress packets (FIGS. 7A–7B). Next, system 600A and its operation is described in detail with respect to independent egress audio streams (FIGS. 8–9).

B. Packets

In one embodiment, the present invention uses two types of packets: (1) IP packets with RTP information and (2) internal egress packets. Both of these types of packets are shown and described with respect to examples in FIGS. 7A and 7B. IP packets 700A are sent and received over a external packet-switched network by packet processors 307 in NIC 306. Internal egress packets 700B are generated by audio sources (e.g. DSPs) 604*a*–604*n*.

1. IP Packets with RTP Information

A standard Internet Protocol (IP) packet 700A is shown in FIG. 7A. IP packet 700A is shown with various components: media access control (MAC) field 704, IP field 706, user datagram protocol (UDP) field 708, RTP field 710, payload 712 containing digital data, and cyclic redundancy check (CRC) field 714. Real-Time Transport Protocol (RTP) is a standardized protocol for carrying periodic data, such as digitized audio, from a source device to a destination device. A companion protocol, Real-Time Control Protocol (RTCP), can also be used with RTP to provide information on the quality of a session.

More specifically, the MAC 704 and IP 706 fields contain addressing information to allow each packet to traverse an IP network interconnecting two devices (origin and destination). UDP field 708 contains a 2-byte port number that identifies a RTP/audio stream channel number so that it can be internally routed to the audio processor destination when received from the network interface. In one embodiment of the present invention, the audio processor is a DSP, as described herein.

RTP field 710 contains a packet sequence number and timestamp. Payload 712 contains the digitized audio byte samples and can be decoded by the endpoint audio processors. Any payload type and encoding scheme for audio and/or video types of media compatible with RTP can be used as would be apparent to a person skilled in the art given this description. CRC field 714 provides a way to verify the integrity of the entire packet. See, the description of RTP packets and payload types described by D. Collins, *Carrier Grade Voice over IP*, pp. 52–72 (the text of the entire book of which is incorporated herein by reference).

2. Internal Egress Packets

FIG. 7B illustrates an example internal egress packet of the present invention in greater detail. Packet 700B includes a control (CTRL) header 720 and a payload 722. The advantage of internal egress packet 700B is it is simpler to create and smaller in size than IP packet 700A. This reduces the burden and work required of audio sources and other components handling the internal egress packets.

In one embodiment, audio sources 604*a*–604*n* are DSPs. Each DSP adds a CTRL header 720 in front of a payload 722 that it creates in for a respective audio stream. CTRL 720 is then used to relay control information downstream. This control information for example can be priority information associated with a particular egress audio stream.

Packet 700B is converted to one or more cells, such as ATM cells, and sent internally over cell switch 304 to a packet processor 307 in network interface controller 306. After the cells are converted to internal egress packets, packet processor 307 decodes and removes internal header CTRL 720. The rest of the IP packet information is added before the payload 722 is transmitted as an IP packet 700A onto an IP network. This achieves an advantage as processing work at the DSPs is reduced. DSPs only have to add a relatively short control header to payloads. The remaining processing work of adding information to create valid IP packets with RTP header information can be distributed to packet processor(s) 307.

C. Priority Levels

Network interface controller (NIC) 306 processes all internal egress packets, as well as all egress IP packets destined for the external network. Thus, NIC 306 can make final forwarding decisions about each packet sent to it based on the content of each packet. In some embodiments, NIC 306 manages the forwarding of egress IP packets based on priority information. This can include switching over to an audio stream of egress IP packets with a higher priority and buffering or not forwarding another audio stream of egress IP packets with a lower priority.

In one embodiment, internal audio sources 604*a*–604*n* determine priority levels. Alternatively, NIC 306 can determine a priority for audio received from an external source at NIC 306. Any number of priority levels can be used. The priority levels distinguish the relative priority of audio sources and their respective audio streams. Priority levels can be based on any criteria selected by a user including, but not limited to, time of day, identity or group of the caller or callee, or other similar factors relevant to audio processing and media services. Components of the system 600 filter and forward the priority level information within the audio stream. In one embodiment, a resource manager in system 600 can interact with external systems to alter the priority levels of audio streams. For example, an external system can be an operator informing the system to queue a billing notice or advertisement on a call. Thus, the resource manager is capable of barging into audio streams. This noiseless switch over can be triggered by user or automatically based on certain predefined events such as signaling conditions like on-hold condition, emergency event, or timed event.

D. Noiseless Fully Meshed Cell Switch

System 600A can be thought of as a "free pool" of multiple input (ingress) and output (egress) audio channels because a fully meshed packet/cell switch 304 is used to switch egress audio channels to participate in any given call. Any egress audio channel can be called upon to participate in a telephone call at any time. During both the initial call setup and while the call is in session, any egress audio channel can be switched into and out of the call. The fully meshed switching capability of system 600A of the present invention provides a precise noiseless switching functionality which does not drop or corrupt the IP packets or the cells of the present invention. In addition, a two-stage egress switching technique is used.

E. Two-Stage Egress Switching

System 600A includes at least two stages of switching. In terms of egress switching, the first stage is cell switch 304. The first stage is cell-based and uses switched virtual circuits (SVCs) to switch audio streams from separate physical sources (audio sources 604*a*–604*n*) to a single destination egress network interface controller (NIC 306). Priority information is provided in the CTRL header 720 of cells generated by the audio sources. The second stage is contained within the egress NIC 306 such that it selects which of the audio streams from multiple audio sources (604*a*–604*n*) to process and send over a packet network such as an packet-switched IP network. This selection of which audio streams to forward can be performed by NIC 306 is based on the priority information provided in the CTRL headers 720. In this way, a second audio stream with a higher priority can be forwarded by NIC 306 on the same channel as a first audio stream. From the perspective of the destination device receiving the audio streams, the insertion of the second audio stream on the channel is received as a noiseless switch between independent audio streams.

More specifically, in one embodiment, the egress audio switching can occur in a telephone call. A call is first established using audio source 604*a* by negotiating with the destination device's MAC, IP, and UDP information, as previously described. First audio source 604*a* begins generating a first audio stream during the call. The first audio stream is made up of internal egress packets having audio payload and CTRL header 720 information as described with respect to packet format 700B. Internal egress packets egress on the channel established for the call. Any type of audio payload including voice, music, tones, or other audio data can be used. SAR 630 converts the internal packets to cells for transport through cell switch 304 to SAR 634. SAR 634 then converts cells back to internal egress packets prior to delivery to NIC 306.

During the flow from the audio source 604*a*, NIC 306 is decoding and removing the CTRL header 720 and adding the appropriate RTP, UDP, IP, MAC, and CRC fields, as previously described. CTRL header 720 includes the priority field used by NIC 306 to process the packet and send a corresponding RTP packet. NIC 306 evaluates the priority field. Given the relatively high priority field (the first audio source 604*a* is the only transmitting source), NIC 306 forwards IP packets with synchronized RTP header information which carry the first audio stream over the network to the destination device associated with the call. (Note CTRL header 720 can also include RTP or other synchronized header information which can be used or ignored by NIC 306 if NIC 306 generates and adds RTP header information).

When the egress audio controller 610 determines a call event where a noiseless switch over is to occur, a second audio source 604*n* begins generating a second audio stream. Audio can be generated by audio source 604*n* directly or by converting audio originally generated by external devices. The second audio stream is made up of internal egress packets having audio payload and CTRL header 720 information as described with respect to packet format 700B. Any type of audio payload including voice, music, or other audio data can be used. Assume the second audio stream is given a higher priority field than the first audio stream. For example, the second audio stream can represent an advertisement, emergency public service message, or other audio data that is desired to have noiselessly inserted into the first channel established with the destination device.

The second audio stream's internal egress packets are then converted to cells by SAR 632. Cell switch 304 switches the cells to an SVC destined for the same destination NIC 306 as the first audio stream. SAR 634 converts the cells back to internal packets. NIC 306 now receives the internal packets for the first and second audio streams. NIC 306 evaluates the priority field in each stream.

The second audio stream having internal packets with the higher priority are converted to IP packets with synchronized RTP header information and forwarded to the destination device. The first audio stream having internal packets with the lower priority are either stored in a buffer or converted to IP packets with synchronized RTP header information and stored in buffer. NIC 306 can resume forwarding the first audio stream when the second audio stream is completed, after a predetermined time elapses, or when a manual or automatic control signal is received to resume.

F. Call Event Triggering Noiseless Switch Over

Figure 9A:
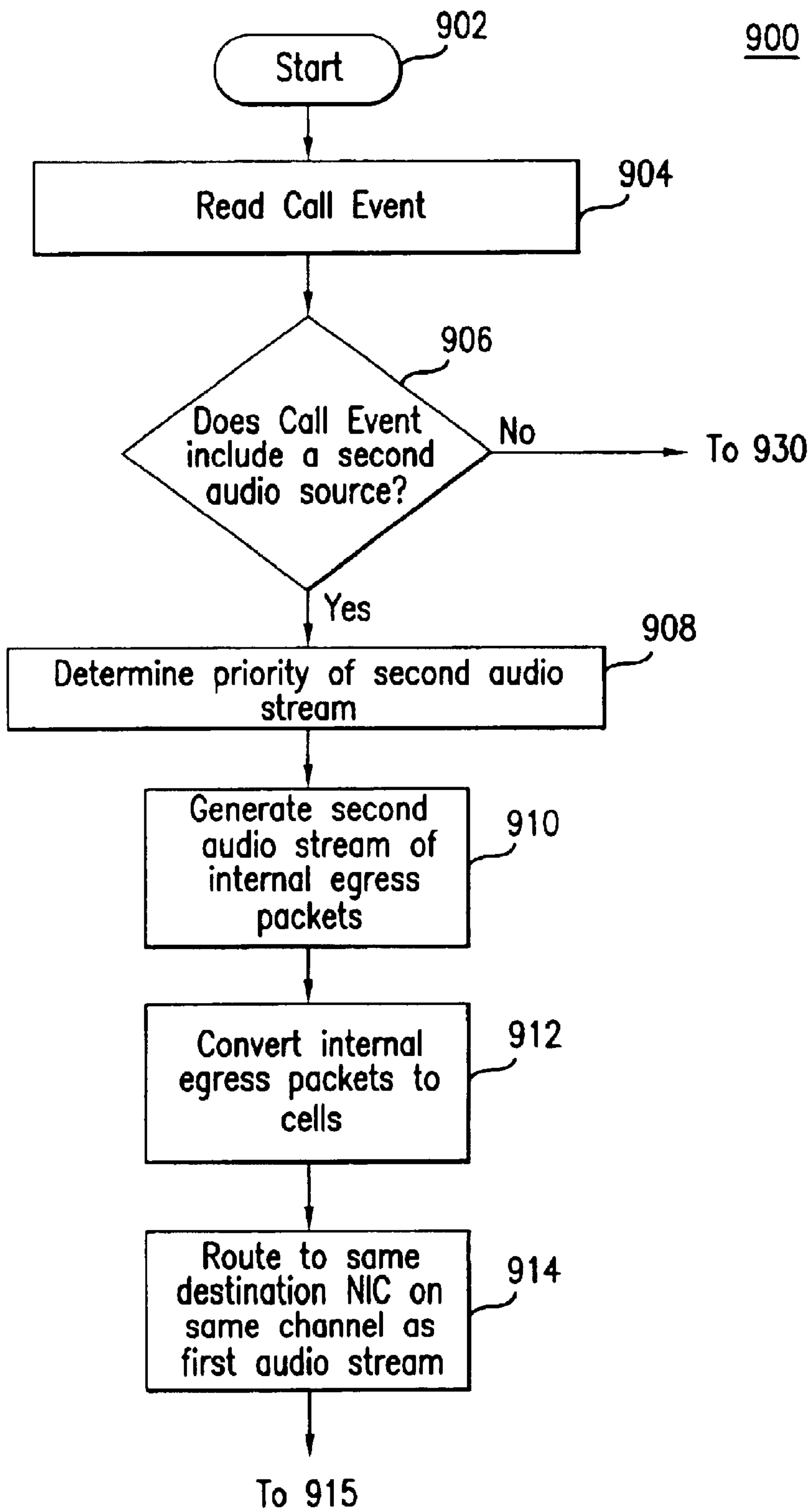
FIGS. 9A, 9B, and 9C are flow diagrams showing the call event processing for audio stream switching according to one embodiment of the present invention.
Figure 9B:
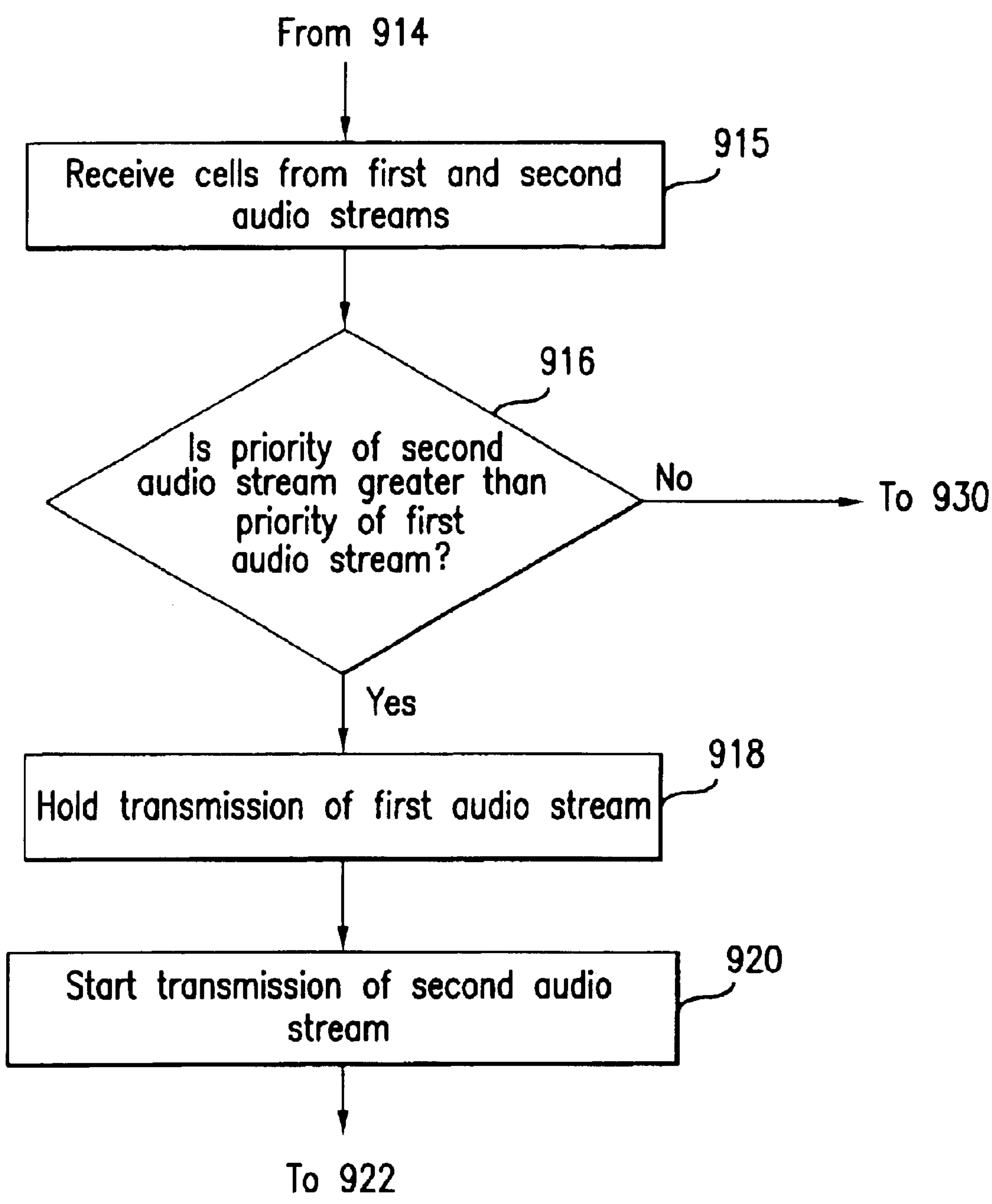

The functionality of the priority field in an embodiment of noiseless switching according to the present invention is now described with regard to FIGS. 8, 9A and 9B.

In FIG. 8, a flow diagram of a noiseless switching routine 800 according to one embodiment of the present invention is shown. For brevity, the noiseless switching routine 800 is described with respect system 600.

Flow 800 begins at step 802 and proceeds immediately to step 804.

In step 804, call control and audio feature manager 302 establishes a call from a first audio source 604*a* to a destination device. Call control and audio feature manager 302 negotiates with the destination device to determine the MAC, IP and UDP port to use in a first audio stream of IP packets sent over a network.

Audio source 604*a* delivers a first audio stream on one channel for the established call. In one embodiment, a DSP delivers the first audio stream of internal egress packets on one channel to cell switch 304 and then to NIC 306. The process proceeds to step 806.

In step 806, egress audio controller 610 sets a priority field for the first audio source. In one embodiment, egress audio controller 610 sets the priority field to a value of one. In another embodiment, the priority field is stored in the CTRL header of the internally routed internal egress packets. The process immediately proceeds to step 808.

In step 808, egress audio controller 610 determines the call's status. In one embodiment, egress audio controller 610 determines whether or not the call allows or has been configured to allow call events to interact with it. In one embodiment of the present invention, a call can be configured so that only emergency call events will interrupt it. In another embodiment, a call can be configured to receive certain call events based on either the caller(s) or callee(s) (i.e., the one or more of the parties on the call). The process immediately proceeds to step 810.

In step 810, egress audio controller 610 monitors for call events. In one embodiment, a call event can be generated within the system 600, such as notifications of time, weather, advertisements, billing ("please insert another coin" or "you have 5 minutes remaining"). In another embodiment, call events can be sent to the system 600, such as requests for news, sporting information, etc. Egress audio controller 610 can monitor both internally and externally for call events. The process proceeds immediately to step 812.

In step 812, egress audio controller 610 receives a call event. If not, then egress audio controller 610 continues to monitor as stated in step 810. If so, then the process proceeds immediately to step 814.

In step 814, egress audio controller 610 determines the call event and performs the operations necessitated by the call event. The process then proceeds to step 816 where it either ends or returns to step 802. In one embodiment, the process 800 repeats for as long as the call continues.

Figure 9C:
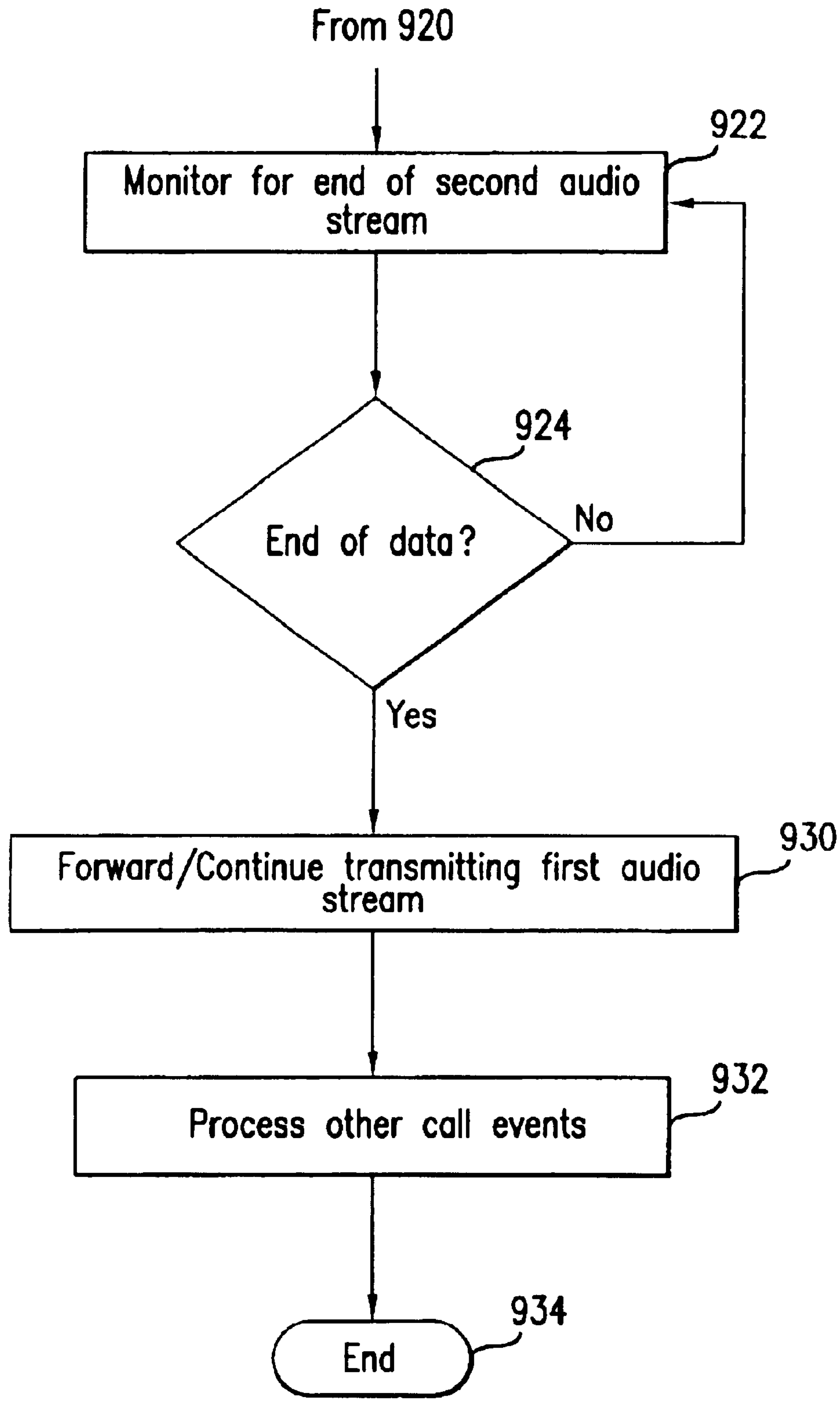

In FIGS. 9A–9C, flow diagram 900 of the call event processing for audio stream switching based on priority according to one embodiment of the present invention are shown. In one embodiment, flow 900 shows in more detail the operations performed in step 814 of FIG. 8.

Process 900 starts at step 902 and proceeds immediately to step 904.

In step 904, egress audio controller 610 reads a call event for an established call. In this operation, a first audio stream from source 604*a* is already being sent from NIC 306 to a destination device as part of the established call. The process proceeds to step 906.

In step 906, egress audio controller 610 determines whether the call event includes a second audio source. If so, then the process proceeds to step 908. If not, then the process proceeds to step 930.

In step 908, egress audio controller 610 determines the priority of the second audio source. In one embodiment, egress audio controller 610 issues a command to second audio source 604*n* that instructs the second audio source to generate a second audio stream of internal egress packets. Priority information for the second audio stream can be automatically generated by the second audio source 604*n* or generated based on a command from the egress audio controller 610. The process then proceeds to step 910.

In step 910, a second audio source 604*n* begins generating a second audio stream. The second audio stream is made up of internal egress packets having audio payload and CTRL header 720 information as described with respect to packet format 700B. Any type of audio payload including voice, music, or other audio data can be used. Audio payload is meant broadly to also include audio data included as part of video data. The process then proceeds to step 912.

In step 912, the second audio stream's egress packets are then converted to cells. In one example, the cells are ATM cells. The process then proceeds to step 914.

In step 914, cell switch 304 switches the cells to an SVC destined for the same destination NIC 306 on the same egress channel as the first audio stream. The process then proceeds to step 915.

As shown in step 915 of FIG. 9B, SAR 634 now receives cells for the first and second audio streams. The cells are converted back to streams of internal egress packets and have control headers that include the respective priority information for the two audio streams.

In step 916, NIC 306 compares the priorities of the two audio streams. If the second audio stream has a higher priority then the process proceeds to step 918. If not, then the process proceeds to step 930.

In step 918, the transmission of the first audio stream is held. For example, NIC 306 buffers the first audio stream or even issues a control command to audio source 604*a* to hold the transmission of the first audio source. The process proceeds immediately to step 920.

In step 920, the transmission of the second audio stream starts. NIC 306 instructs packet processor(s) 307 to create IP packets having the audio payload of the internal egress packets of the second audio stream. Packet processor(s) 307 add additional synchronized RTP header information (RTP packet information) and other header information (MAC, IP, UDP fields) to the audio payload of the internal egress packets of the second audio stream.

NIC 306 then sends the IP packets with synchronized RTP header information on the same egress channel of the first audio stream. In this way, a destination device receives the second audio stream noise instead of the first audio stream. Moreover, from the perspective of the destination device this second audio stream is received in real-time noiselessly without delay or interruption. Steps 918 and 920 of course can be performed at the same time or in any order. The process proceeds immediately to step 922.

As shown in FIG. 9C, NIC 306 monitors for the end of the second audio stream (step 922). The process proceeds immediately to step 924.

In step 924, NIC 306 determines whether the second audio stream has ended. In one example, NIC 306 reads a last packet of the second audio stream which has a priority level lower than preceding packets. If so, then the process proceeds immediately to step 930. If not, then the process proceeds to step 922.

In step 930, NIC 306 either continues to forward the first audio stream (after step 906) or returns to forwarding the first audio stream (after steps 916 or 924). The process proceeds to step 932.

In one embodiment, NIC 306 maintains a priority level threshold value. NIC 306 then increments and sets the threshold based on priority information in the audio streams. When faced with multiple audio streams, NIC 306 forwards the audio stream having priority information equal to or greater than the priority level threshold value. For example, if the first audio stream had a priority value of 1 then the priority level threshold value is set to 1 and the first audio stream is transmitted (prior to step 904). When a second audio stream with a higher priority is received at NIC 306, then NIC 306 increments the priority threshold value to 2. The second audio stream is then transmitted as described above in step 920. When the last packet of the second audio stream having a priority field value set to 0 (or null or other special value) is read, then the priority level threshold value is decremented back to 1 as part of step 924. In this case, the first audio stream with priority information 1 is then be sent by NIC 306 as described above with respect to step 930.

In step 932, egress audio controller 610 processes any remaining call events. The process then proceeds to step 934 where it terminates until re-instantiated. In one embodiment, the steps of the above-described process occur substantially at the same time, such that the process can be run in parallel or in an overlapping manner on one or more processors in the system 600.

G. Audio Data Flow

Figure 6B:
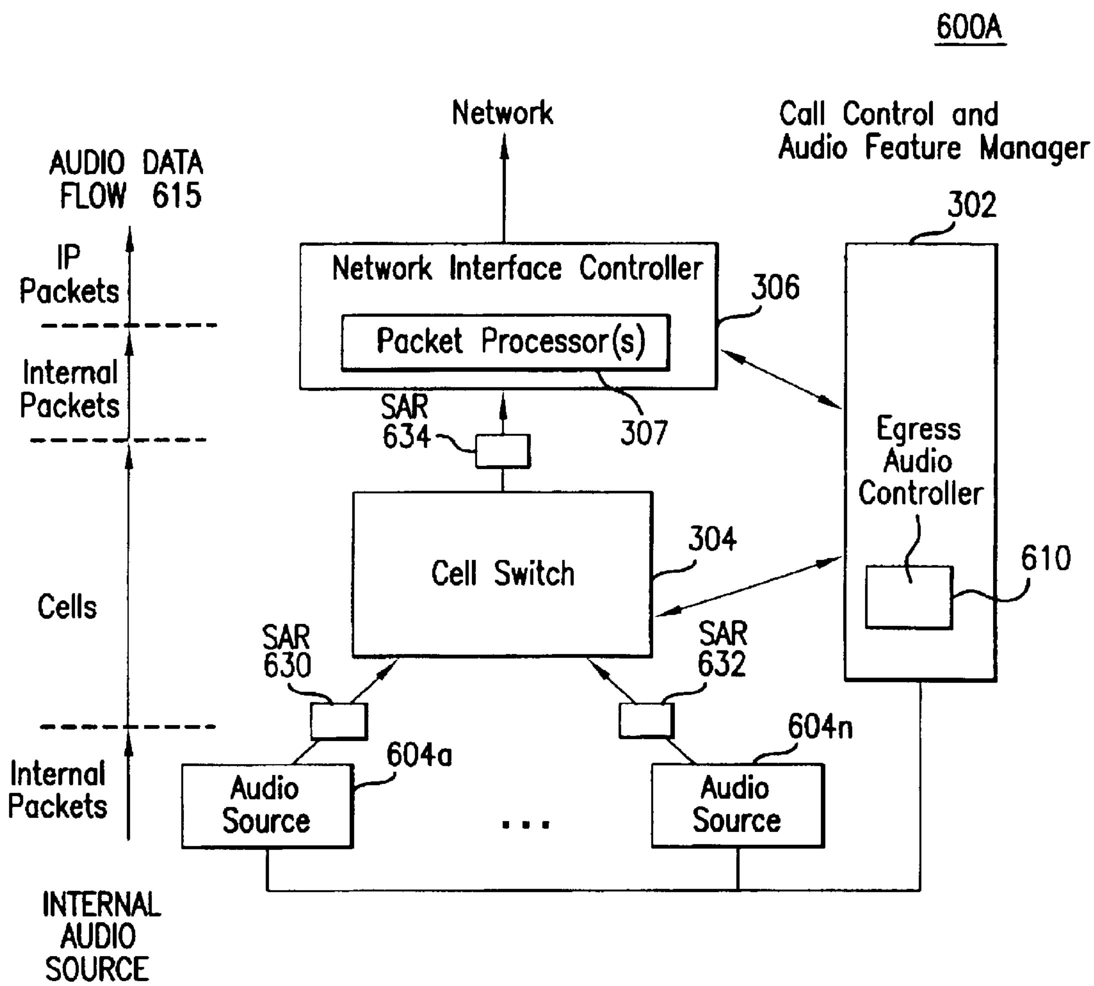

FIG. 6B is a diagram of audio data flow 615 in the noiseless switch over system of FIG. 6A in one embodiment. In particular, FIG. 6B shows the flow of internal packets from audio sources 604*a–n* to SARs 630, 632, the flow of cells through cell switch 304 to SAR 634, the flow of internal packets between SAR 634 and packet processors 307, and the flow of IP packets from NIC 306 over the network.

H. Other Embodiments

Figure 6C:
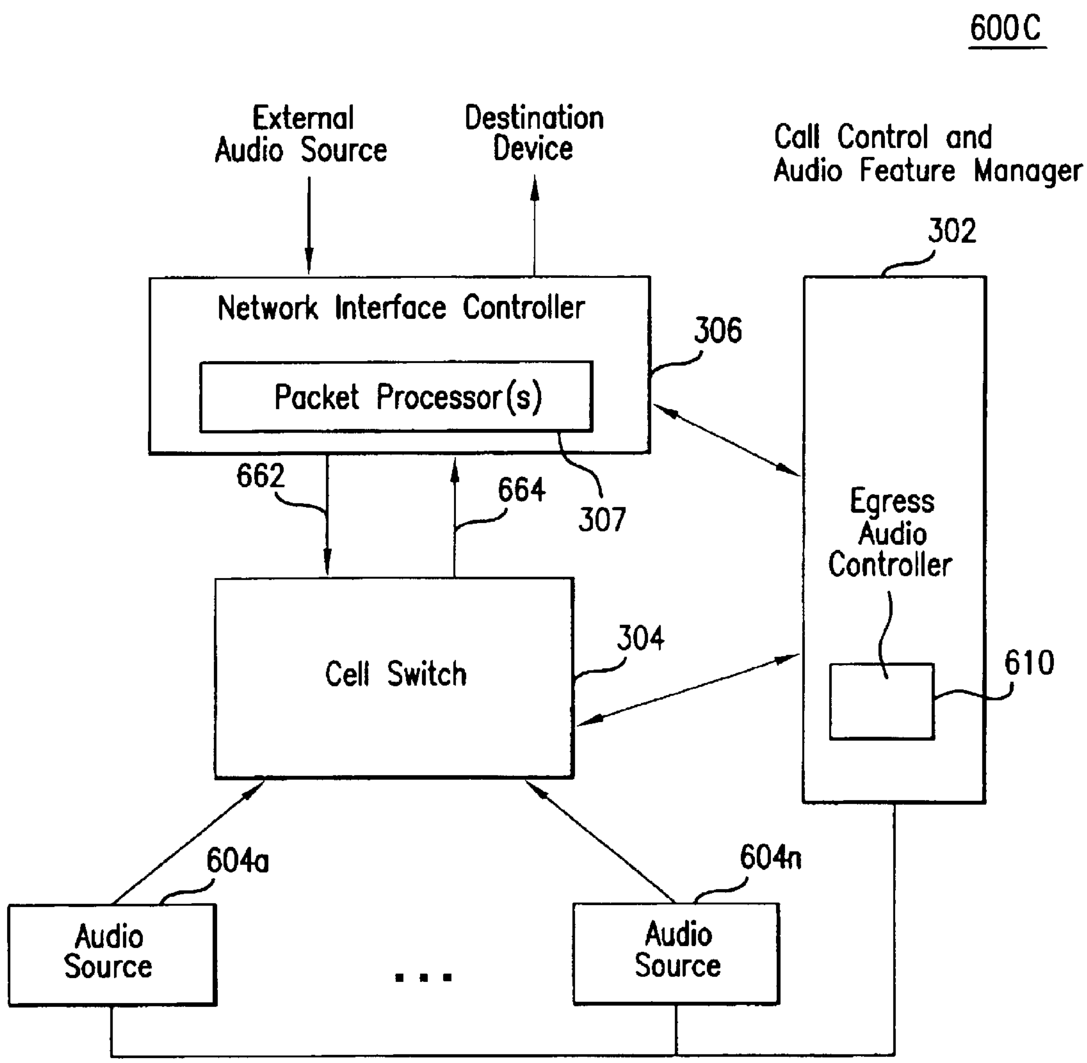
Figure 6D:
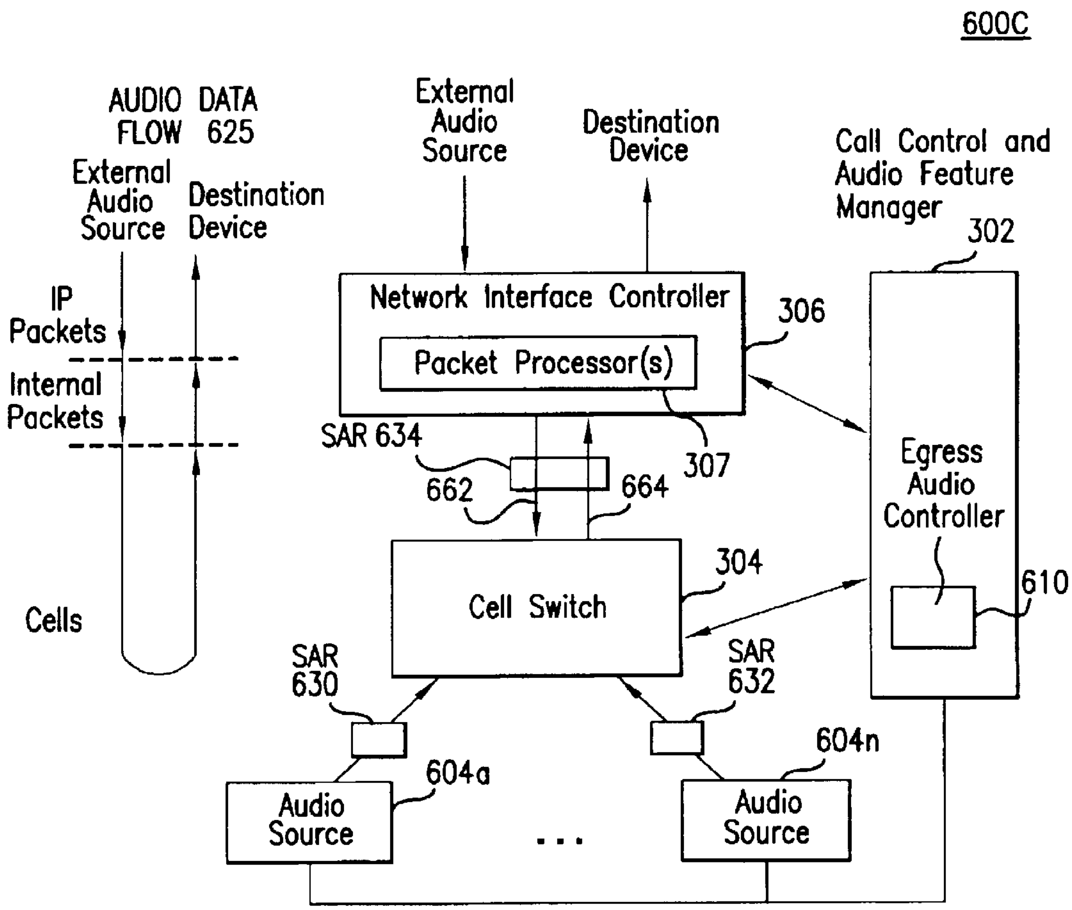

The present invention is not limited to internal audio sources or a cell layer. Noiseless switch over can also be carried out in different embodiments using internal audio sources only, internal and external audio sources, external audio sources only, a cell switch or a packet switch. For example, FIG. 6C is diagram of a noiseless switch over system 600C that carries out cell switching between independent egress audio streams generated by internal audio source 604*a–n* and/or external audio sources (not shown) according to an embodiment of the present invention. Noiseless switch over system 600C operates similar to system 600A described in detail above except that noiseless switch over is made to audio received from an external audio source. The audio is received in IP packets and buffered at NIC 306 as shown in FIG. 6C. NIC 306 strips IP information (stores it in forward table entry associated with external audio source and destination device) and generates internal packets assigned to a SVC. SAR 634 converts the internal packets to cells and routes cells on the SVC on link 662 through switch 304 back through link 664 to SAR 634 for conversion to internal packets. As described above, the internal packets are then processed by packet processor 307 to create IP packets with synchronized header information. NIC 306 then sends the IP packets to destination device. In this way, a user at the destination device is noiselessly switched over to receive audio from an external audio source. FIG. 6D is diagram of audio data flow 625 for an egress audio stream received from the external audio source in the noiseless switch over system of FIG. 6C. In particular, FIG. 6D shows the flow of IP packets from an external audio source (not shown) to NIC 306, the flow of internal packets from NIC 306 to SAR 634, the flow of cells through cell switch 304 back to SAR 634, the flow of internal packets between SAR 634 and packet processors 307, and the flow of IP packets from NIC 306 over the network to a destination device (not shown).

Figure 6E:
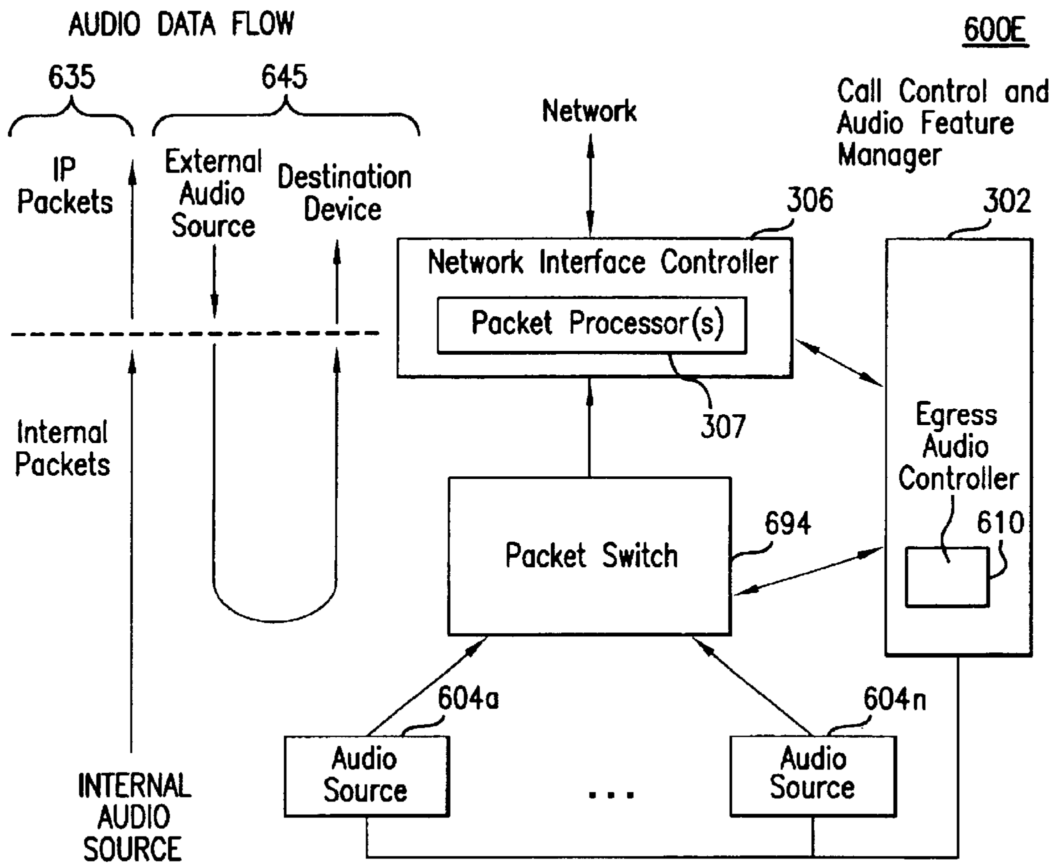

FIG. 6E is diagram of audio data flows 635, 645 in a noiseless switch over system 600E that carries out packet switching between independent egress audio streams generated by internal and/or external audio sources according to an embodiment of the present invention. Noiseless switch over system 600E operates similar to systems 600A and 600C described in detail above except that a packet switch 694 is used instead of a cell switch 304. In this embodiment, a cell layer including SARs 630, 632, 634 is omitted. In audio data flow 635, internal packets flow through the packet switch 694 from internal audio sources 604*a–n* to packet processors 307. IP packets flow out to the network. In audio data flow 645, IP packets from an external audio source (not shown) are received at NIC 306. The audio is received in packets and buffered at NIC 306 as shown in FIG. 6E. NIC 306 strips IP information (stores it in forward table entry associated with external audio source and destination device) and generates internal packets assigned to a SVC (or other type of path) associated with the destination device. The internal packets are routed on the SVC through packet switch 694 to NIC 306. As described above, the internal packets are then processed by packet processor 307 to create IP packets with synchronized header information. NIC 306 then sends the IP packets to destination device. In this way, a user at the destination device is noiselessly switched over to receive audio from an external audio source.

Figure 6F:
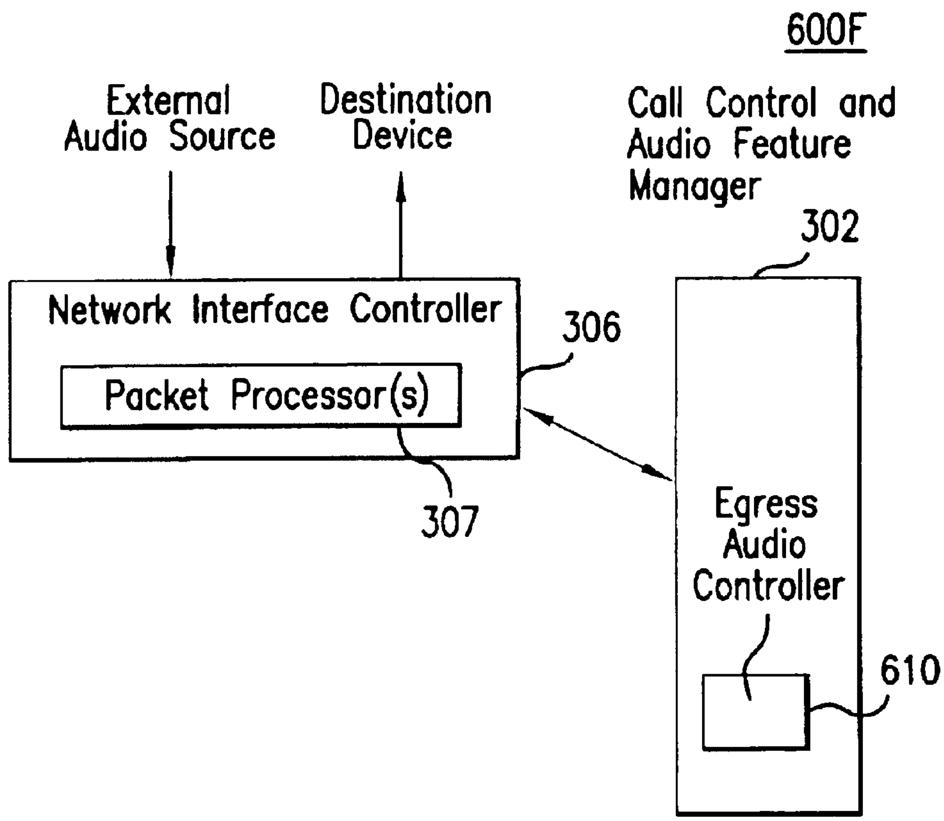

FIG. 6F is diagram of a noiseless switch over system 600F that carries out switching between independent egress audio streams generated by only external audio sources according to an embodiment of the present invention. No switch or internal audio sources are required. NIC 306 strips IP information (stores it in forward table entry associated with external audio source and destination device) and generates internal packets assigned to a SVC (or other type of path) associated with the destination device. The internal packets are routed on the SVC to NIC 306. (NIC 306 can be a common source and destination point). As described above, the internal packets are then processed by packet processor 307 to create IP packets with synchronized header information. NIC 306 then sends the IP packets to destination device. In this way, a user at the destination device is noiselessly switched over to receive audio from an external audio source.

Functionality described above with respect to the operation of egress audio switching system 600 can be implemented in control logic. Such control logic can be implemented in software, firmware, hardware or any combination thereof.

X. Conference Call Processing

A. Distributed Conference Bridge

Figure 10:
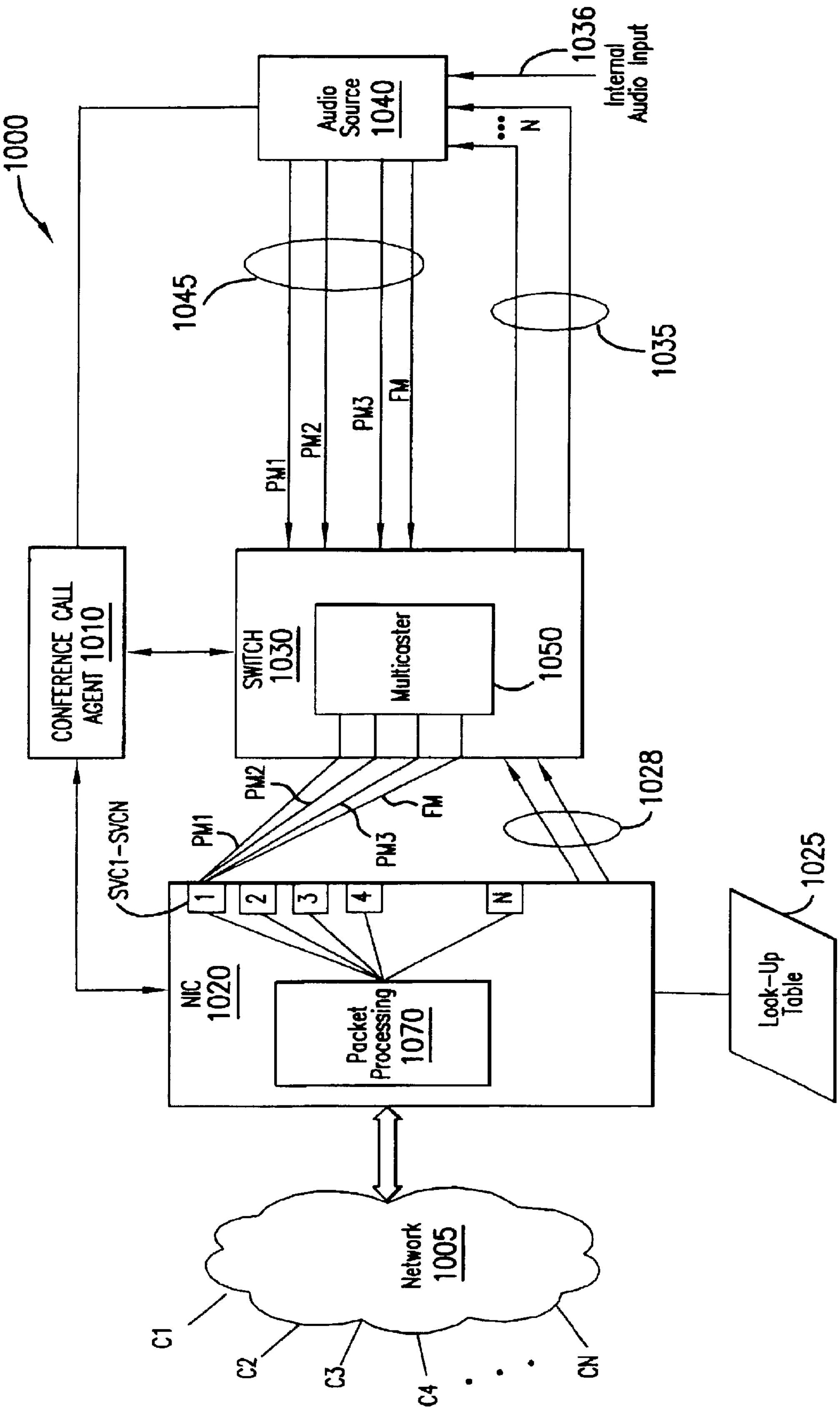
FIG. 10 is a block diagram of a distributed conference bridge according to one embodiment of the present invention.

FIG. 10 is a diagram of a distributed conference bridge 1000 according to one embodiment of the present invention. Distributed conference bridge 1000 is coupled to a network 1005. Network 1005 can be any type of network or combination of networks, such as, the Internet. For example, network 1005 can include a packet-switched network or a packeted-switched network in combination with a circuit-switched network. A number of conference call participants C1–CN can connect through network 1005 to distributed conference bridge 1000. For example, conference call participants C1–CN can place a VOIP call through network 1005 to contact distributed conference bridge 1000. Distributed conference bridge 1000 is scalable and can handle any number of conference call participants. For example, distributed conference bridge 1000 can handle conference calls between two conference call participants up to 1000 or more conference call participants.

As shown in FIG. 10, distributed conference bridge 1000 includes a conference call agent 1010, network interface controller (NIC) 1020, switch 1030, and audio source 1040. Conference call agent 1010 is coupled to NIC 1020, switch 1030 and audio source 1040. NIC 1020 is coupled between network 1005 and switch 1030. Switch 1030 is coupled between NIC 1020 and audio source 1040. A look-up table 1025 is coupled to NIC 1020. Look-up table 1025 (or a separate look-up table not shown) can also be coupled to audio source 1040. Switch 1030 includes a multicaster 1050. NIC 1020 includes a packet processor 1070.

Conference call agent 1010 establishes a conference call for a number of participants. During a conference call, packets carrying audio, such as digitized voice, flow from the conference call participants C1–CN to the conference bridge 1000. These packets can be IP packets including, but not limited to, RTP/RTCP packets. NIC 1020 receives the packets and forwards the packets along links 1028 to switch 1030. Links 1028 can be any type of logical and/or physical links such as PVCs or SVCs. In one embodiment, NIC 1020 converts IP packets (as described above with respect to FIG. 7A) to internal packets which only have a header and payload (as described with respect to FIG. 7B). The use of the internal packets further reduces processing work at audio source 1040. Incoming packets processed by NIC 1020 can also be combined by a SAR into cells, such as ATM cells, and sent over link(s) 1028 to switch 1030. Switch 1030 passes the incoming packets from NIC 1020 (or cells) to audio source 1040 on link(s) 1035. Link(s) 1035 can also be any type of logical and/or physical link including, but not limited to, a PVC or SVC.

Audio provided over links 1035 is referred to in this conference bridge processing context as "external audio" since it originates from conference call participants over network 1005. Audio can also be provided internally through one or more links 1036 as shown in FIG. 10. Such "internal audio" can be speech, music, advertisements, news, or other audio content to be mixed in the conference call. The internal audio can be provided by any audio source or accessed from a storage device coupled to conference bridge 1000.

Audio source 1040 mixes audio for the conference call. Audio source 1040 generates outbound packets containing the mixed audio and sends the packets over link(s) 1045 to switch 1030. In particular, audio source 1040 generates a fully mixed audio stream of packets and a set of partially mixed audio streams. In one embodiment, audio source 1040 (or "mixer" since it is mixing audio) dynamically generates the appropriate fully mixed and partially mixed audio streams of packets having conference identifier information (CID) and mixed audio during the conference call. The audio source retrieves the appropriate CID information of conference call participants from a relatively static look-up table (such as table 1025 or a separate table closer to audio source 1040) generated and stored at the initiation of the conference call.

Multicaster 1050 multicasts the packets in the fully mixed audio stream and a set of partially mixed audio streams. In one embodiment, multicaster 1050 replicates the packets in each of the fully mixed audio stream and set of partially mixed audio streams N times which corresponds to the N number of conference call participants. The N replicated packets are then sent to endpoints in NIC 1020 over the N switched virtual circuits (SVC1–SVCN), respectively. One advantage of distributed conference bridge 1000 is that audio source 1040 (i.e., the mixing device) is relieved of the work of replication. This replication work is distributed to multicaster 1050 and switch 1030.

NIC 1020 then processes outbound packets arriving on each SVC1-SVCN to determine whether to discard or forward the packets of the fully mixed and partially mixed audio streams to a conference call participant C1–CN. This determination is made based on packet header information in real-time during a conference call. For each packet arriving on a SVC, NIC 1020 determines based on packet header information, such as TAS and IAS fields, whether the packet is appropriate for sending to a participant associated with the SVC. If yes, then the packet is forwarded for further packet processing. The packet is processed into a network packet and forwarded to the participant. Otherwise, the packet is discarded. In one embodiment, the network packet is an IP packet which includes the destination call participant's network address information (IP/UDP address) obtained from a look-up table 1025, RTP/RTCP packet header information (time stamp/sequence information), and audio data. The audio data is the mixed audio data appropriate for the particular conference call participant. The operation of distributed conference bridge 1000 is described further below with respect to an example look-up table 1025 shown in FIG. 11, flowchart diagrams shown in FIGS. 12 and 13A–13C, and example packet diagrams shown in FIGS. 14A, 14B and 15.

B. Distributed Conference Bridge Operation

Figure 12:
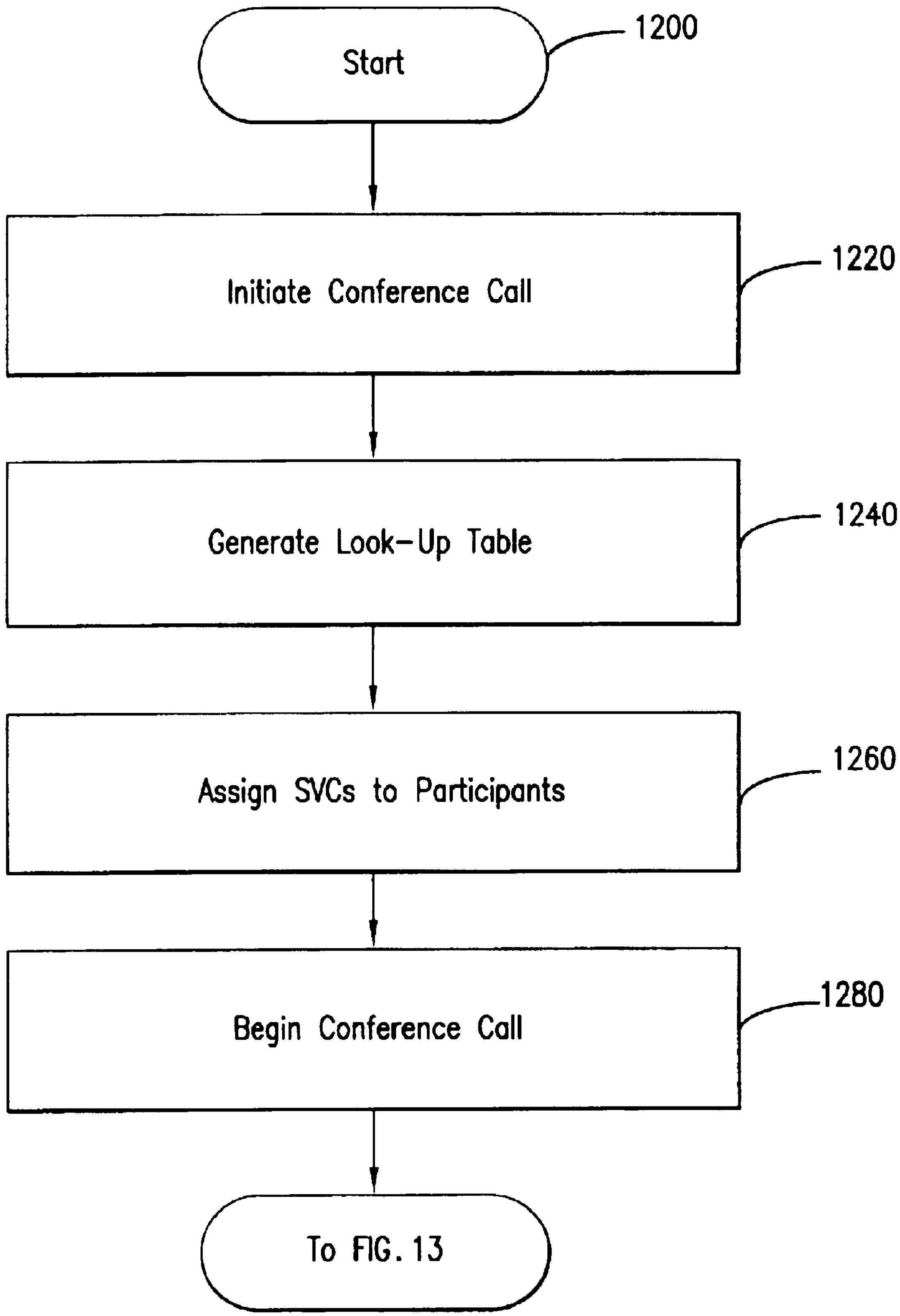
FIG. 12 is a flowchart diagram of the operation of the distributed conference bridge of FIG. 10 in establishing a conference call.

FIG. 12 shows a routine 1200 for establishing conference bridge processing according to the present invention. (Steps 1200–1280). In step 1220, a conference call is initiated. A number of conference call participants C1–CN dial distributed conference bridge 1000. Each participant can use any VOIP terminal including, but not limited to, a telephone, computer, PDA, set-top box, network appliance, etc. Conference call agent 1010 performs conventional IVR processing to acknowledge that a conference call participant wishes to participate in a conference call and obtains the network address of each conference call participant. For example, the network address information can include, but is not limited to, IP and/or UDP address information.

In step 1240, look-up table 1025 is generated. Conference call agent 1010 can generate the look-up table or instruct NIC 1020 to generate the look-up table. As shown in the example on FIG. 11, look-up table 1025 includes N entries corresponding to the N conference call participants in the conference call initiated in step 1220. Each entry in look-up table 1025 includes an SVC identifier, conference ID (CID), and network address information. The SVC identifier is any number or tag that identifies a particular SVC. In one example, the SVC identifier is a Virtual Path Identifier and Virtual Channel Identifier (VPI/VCI). Alternatively, the SVC identifier or tag information can be omitted from look-up table 1025 and instead be inherently associated with the location of the entry in the table. For example, a first SVC can be associated with the first entry in the table, a second SVC can be associated with a second entry in the table, and so forth. The CID is any number or tag assigned by conference call agent 1010 to a conference call participant C1–CN. The network address information is the network address information collected by conference call agent 1010 for each of the N conference call participants.

In step 1260, NIC 1020 assigns respective SVCs to each of the participants. For N conference call participants then N SVCs are assigned. Conference call agent 1010 instructs NIC 1020 to assign N SVCs. NIC 1020 then establishes N SVC connections between NIC 1020 and switch 1030. In step 1280, the conference call then begins. Conference call agent 1010 sends a signal to NIC 1020 and switch 1030 and audio source 1040 to begin conference call processing. Although FIG. 12 is described with respect to SVCs and SVC identifiers, the present invention is not so limited and any type of link (physical and/or logical) and link identifier can be used. Also, in embodiments where an internal audio source is included, conference call agent 1010 adds the internal audio source as one of the potential N audio participants whose input is to be mixed at audio source 1040.

Figure 13A:
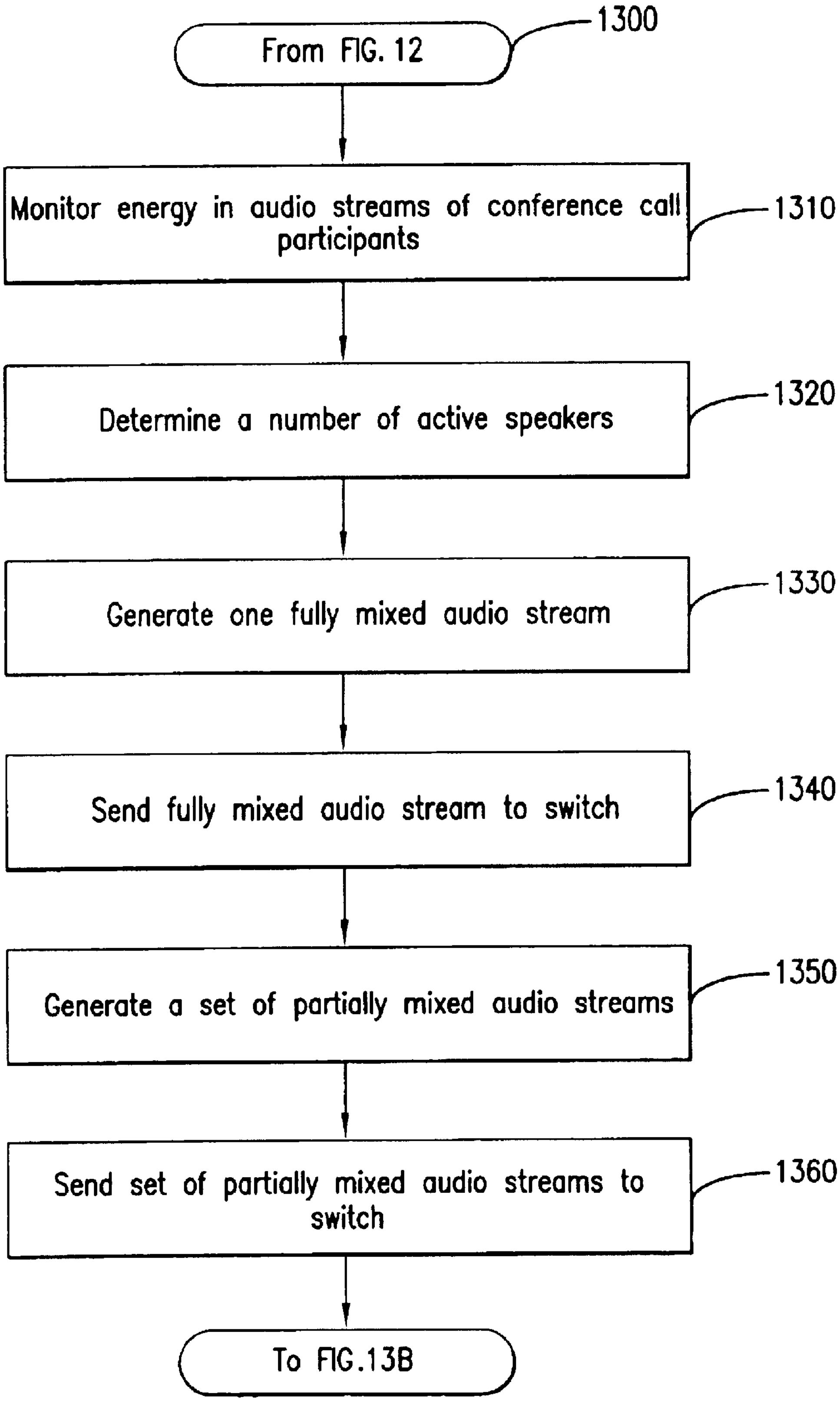
FIGS. 13A, 13B, and 13C are flowchart diagrams of the operation of the distributed conference bridge of FIG. 10 in processing a conference call.
Figure 13B:
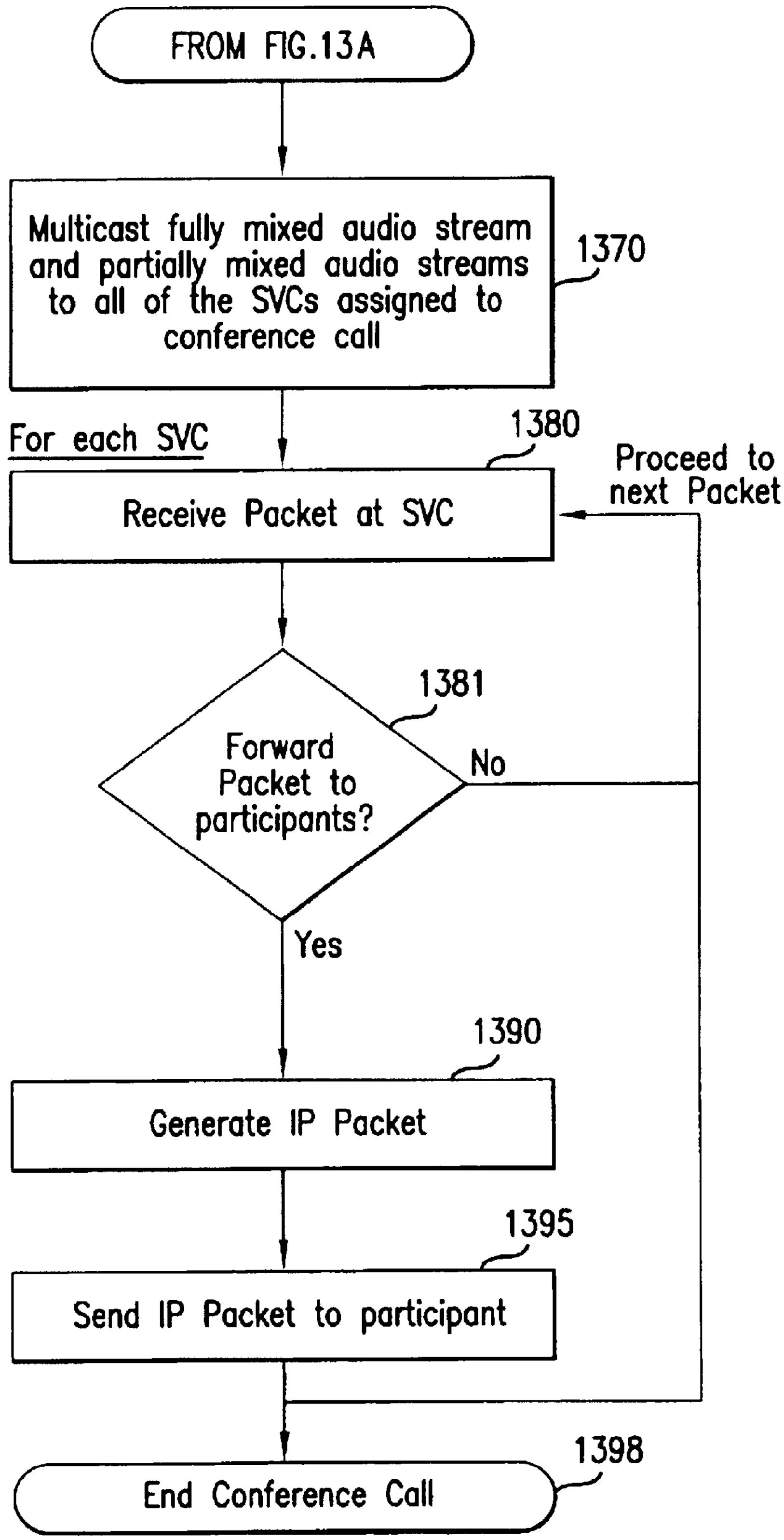
Figure 13C:
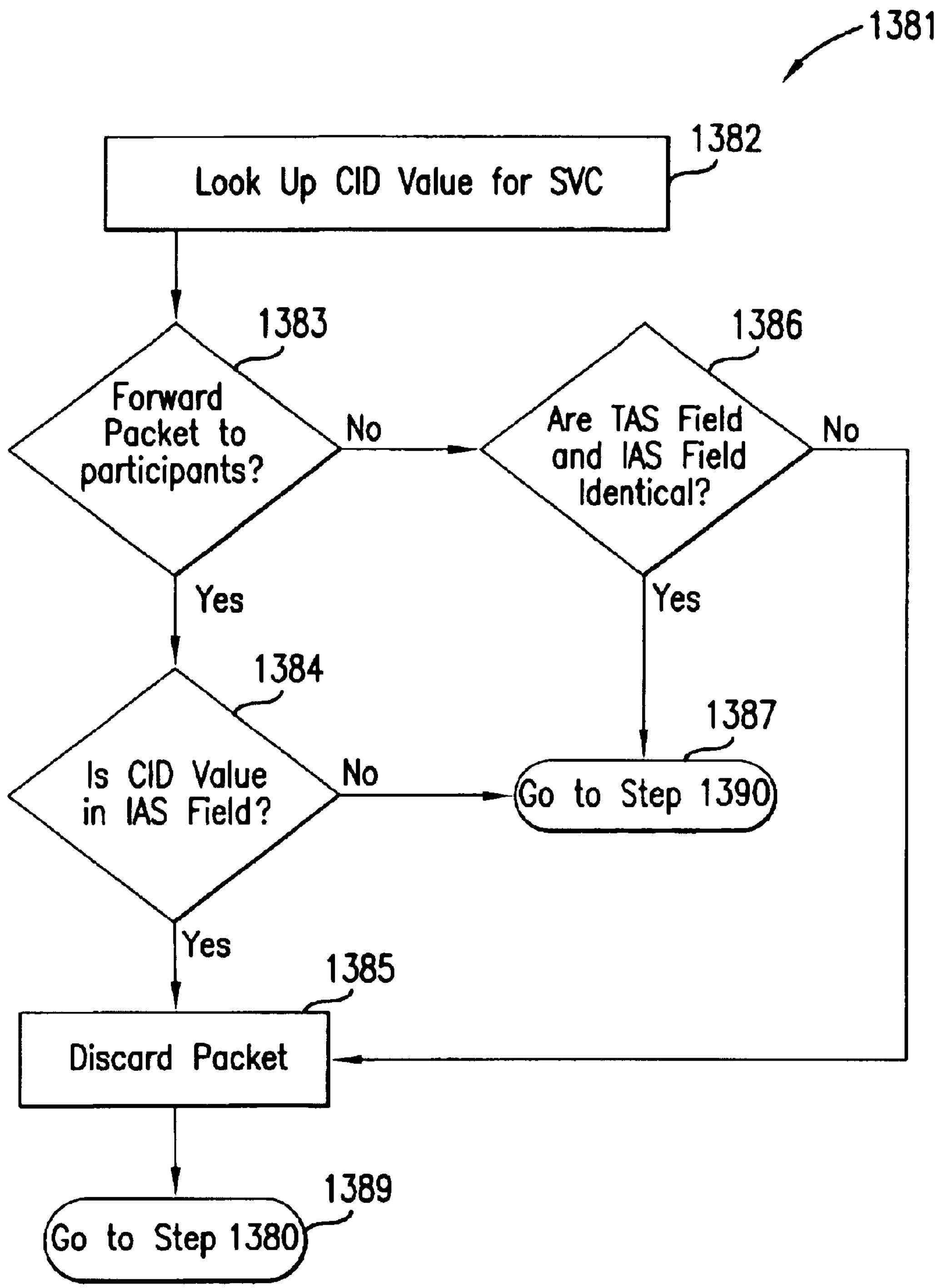

The operation of distributed conference bridge 1000 during conference call processing is shown in FIGS. 13A–13C (steps 1300–1398). Control begins at step 1300 and proceeds to step 1310. In step 1310, audio source 1040 monitors energy in the incoming audio streams of the conference call participant C1–CN. Audio source 1040 can be any type of audio source including, but not limited to, a digital signal processor (DSP). Any conventional technique for monitoring the energy of a digitized audio sample can be used. In step 1320, audio source 1040 determines a number of active speakers based on the energy monitored in step 1310. Any number of active speakers can be selected. In one embodiment, a conference call is limited to three active speakers at a given time. In this case, up to three active speakers are determined which correspond to the up to three audio streams having the most energy during the monitoring in step 1320.

Figure 14A:
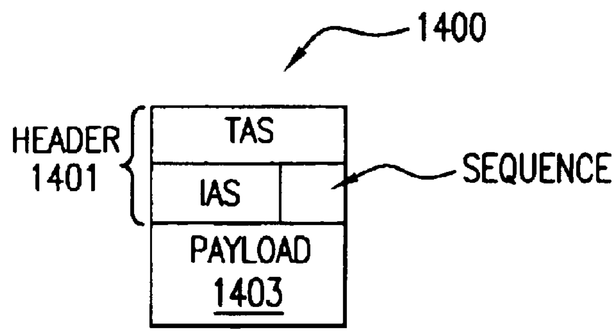
FIG. 14A is a diagram of an example internal packet generated by an audio source during a conference call according to one embodiment of the present invention.

Next, audio source 1040 generates and sends fully mixed and partially mixed audio streams (steps 1330-1360). In step 1330, one fully mixed audio stream is generated. The fully mixed audio stream includes the audio content of the active speakers determined in step 1320. In one embodiment, the fully mixed audio stream is an audio stream of packets with packet headers and payloads. Packet header information identifies the active speakers whose audio content is included in the fully mixed audio stream. In one example, as shown in FIG. 14A audio source 1040 generates an outbound internal packet 1400 having a packet header 1401 with TAS, IAS, and Sequence fields and a payload 1403. The TAS field lists CIDs of all of the current active speaker calls in the conference call. The IAS field lists CIDs of the active speakers whose audio content is in the mixed stream. The sequence information can be a timestamp, numeric sequence value, or other type of sequence information. Other fields (not shown) can include checksum or other packet information depending upon a particular application. In the case of a fully mixed audio stream, the TAS and IAS fields are identical. Payload 1403 contains a portion of the digitized mixed audio in the fully mixed audio stream.

In step 1340, audio source 1040 sends the fully mixed audio stream generated in step 1330 to switch 1030. Eventually, passive participants in the conference call (that is those determined not to be in the number of active speakers determined in step 1320), will hear mixed audio from the fully mixed audio stream.

In step 1350, audio source 1040 generates a set of partially mixed audio streams. The set of partially mixed audio streams is then sent to switch 1030 (step 1360). Each of the partially mixed audio streams generated in step 1350 and sent in step 1360 includes the mixed audio content of the group of identified active speakers determined in step 1320 minus the audio content of a respective recipient active speaker. The recipient active speaker is the active speaker within the group of active speakers determined in step 1320 towards which a partially mixed audio stream is directed.

In one embodiment, audio source 1040 inserts in packet payloads the digital audio from the group of identified active speakers minus the audio content of the recipient active speaker. In this way, the recipient active speaker will not receive audio corresponding to their own speech or audio input. However, the recipient active speaker will hear the speech or audio input of the other active speakers. In one embodiment, packet header information is included in each partially mixed audio stream to identify active speakers whose audio content is included in the respective partially mixed audio stream. In one example, audio source 1040 uses the packet format of FIG. 14A and inserts one or more conference identification numbers (CIDs) into TAS and IAS header fields of packets. The TAS field lists CIDs of all of the current active speakers in the conference call. The IAS field lists CIDs of the active speakers whose audio content is in the respective partially mixed stream. In the case of a partially mixed audio stream, the TAS and IAS fields are not identical since the IAS field has one less CID. In one example, to build packets in steps 1330 and 1350, audio source 1040 retrieves the appropriate CID information of conference call participants from a relatively static look-up table (such as table 1025 or a separate table) generated and stored at the initiation of the conference call.

For example, in a conference call where there are 64 participants (N=64) of which three are identified as active speakers (1–3), then one fully mixed audio stream will contain audio from all three active speakers. This fully mixed stream is eventually sent to each of the 61 passive participants. Three partially mixed audio streams are then generated in step 1350. A first partially mixed stream 1 contains audio from speakers 2–3 but not speaker 1. A second partially mixed stream 2 contains audio from speakers 1–3 but not speaker 2. A third partially mixed stream 3 contains audio from speakers 1 and 2 but not speaker 3. The first through third partially mixed audio streams are eventually sent to speakers 1–3 respectively. In this way only four mixed audio streams (one fully mixed and three partially mixed) need be generated by audio source 1040. This reduces the work on audio source 1040.

As shown in FIG. 13B, in step 1370, multicaster 1050 replicates packets in the fully mixed audio stream and set of partially mixed audio streams and multicasts the replicated packet copies on all of the SVCs (SVC1-SVCN) assigned to the conference call. NIC 1020 then processes each packet received on the SVC (step 1380). For clarity, each packet processed internally in distributed conference bridge 1000 (including packets received at SVCs by NIC 1020) are referred to as internal packets. Internal packets can be any type of packet format including, but not limited to, IP packets and/or internal egress packets described above in FIGS. 7A and 7B, and the example internal egress or outbound packet described with respect to FIG. 14A.

For each SVC, NIC 1020 determines whether to discard or forward a received internal packet for further packet processing and eventual transmission to a corresponding conference call participant (step 1381). The received internal packet can be from a fully mixed or partially mixed audio stream. If yes, the packet is to be forwarded, then control proceeds to step 1390. If no, the packet is not to be forwarded, then control proceeds to step 1380 to process the next packet. In step 1390, the packet is processed into a network IP packet. In one embodiment, packet processor 1070 generates a packet header with at least the participant's network address information (IP and/or UDP address) obtained from the look-up table 1025. Packet processor 1070 further adds sequence information such as RTP/RTCP packet header information (e.g., a timestamp and/or other type of sequence information). Packet processor 1070 can generate such sequence information based on the order of received packets and/or based on sequence information (e.g. the Sequence field) provided in packets generated by the audio source 1040 (or by multicaster 1050). Packet processor 1070 further adds a payload in each network packet that includes audio from the received internal packet being forwarded to a participant. NIC 1020 (or packet processor 1070) then sends the generated IP packet to the participant (step 1395).

One feature of the present invention is that the packet processing determination in step 1381 can be performed quickly and in real-time during a conference call. FIG. 13C shows one example routine for carrying out the packet processing determination step 1381 according to the present invention (steps 1382–1389). This routine is carried out for each outbound packet that arrives on each SVC. NIC 1020 acts as a filter or selector in determining which packets are discarded and which are converted to IP packets and sent to a call participant.

When an internal packet arrives on a SVC, NIC 1020 looks up an entry in look up table 1025 that corresponds to the particular SVC and obtains a CID value (step 1382). NIC 1020 then determines whether the obtained CID value matches any CID value in the Total Active Speakers (TAS) field of the internal packet (step 1383). If yes, control proceeds to step 1384. If no, control proceeds to step 1386. In step 1384, NIC 1020 determines whether the obtained CID value matches any CID value in the Included Active Speakers (IAS) field of the internal packet. If yes, control proceeds to step 1385. If no, control proceeds to step 1387. In step 1385, the packet is discarded. Control then proceeds to step 1389 which returns control to step 1380 to process a next packet. In step 1387, control jumps to step 1390 for generating an IP packet from the internal packet.

In step 1386, a comparison of the TAS and IAS fields is made. If the fields are identical (as in the case of a fully mixed audio stream packet), then control proceeds to step 1387. In step 1387, control jumps to step 1390. If the TAS and IAS fields are not identical, then control proceeds to step 1385 and the packet is discarded.

C. Outbound Packet Flow through Distributed Conference Bridge

Figure 14B:
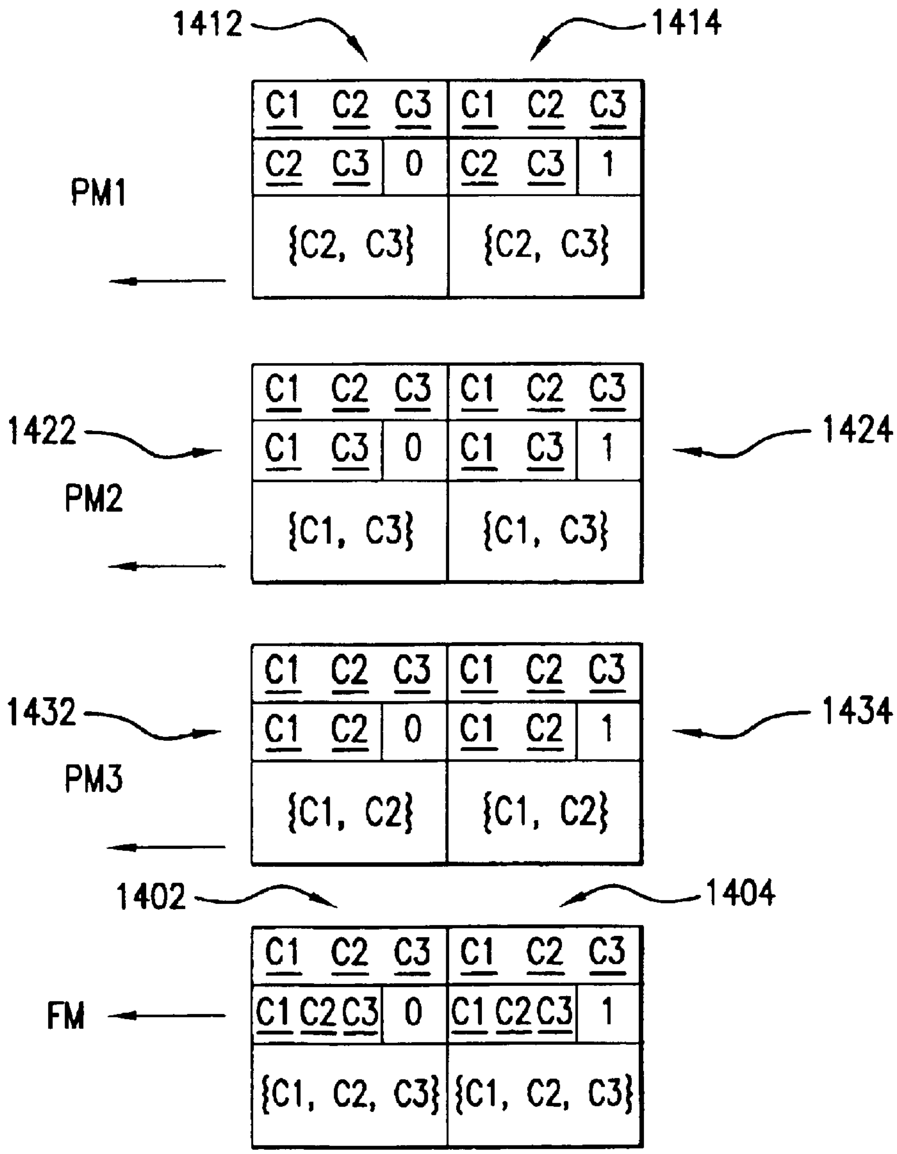
FIG. 14B is a diagram that illustrates example packet content in a fully mixed audio stream and set of partially mixed audio streams according to the present invention.
Figure 15:
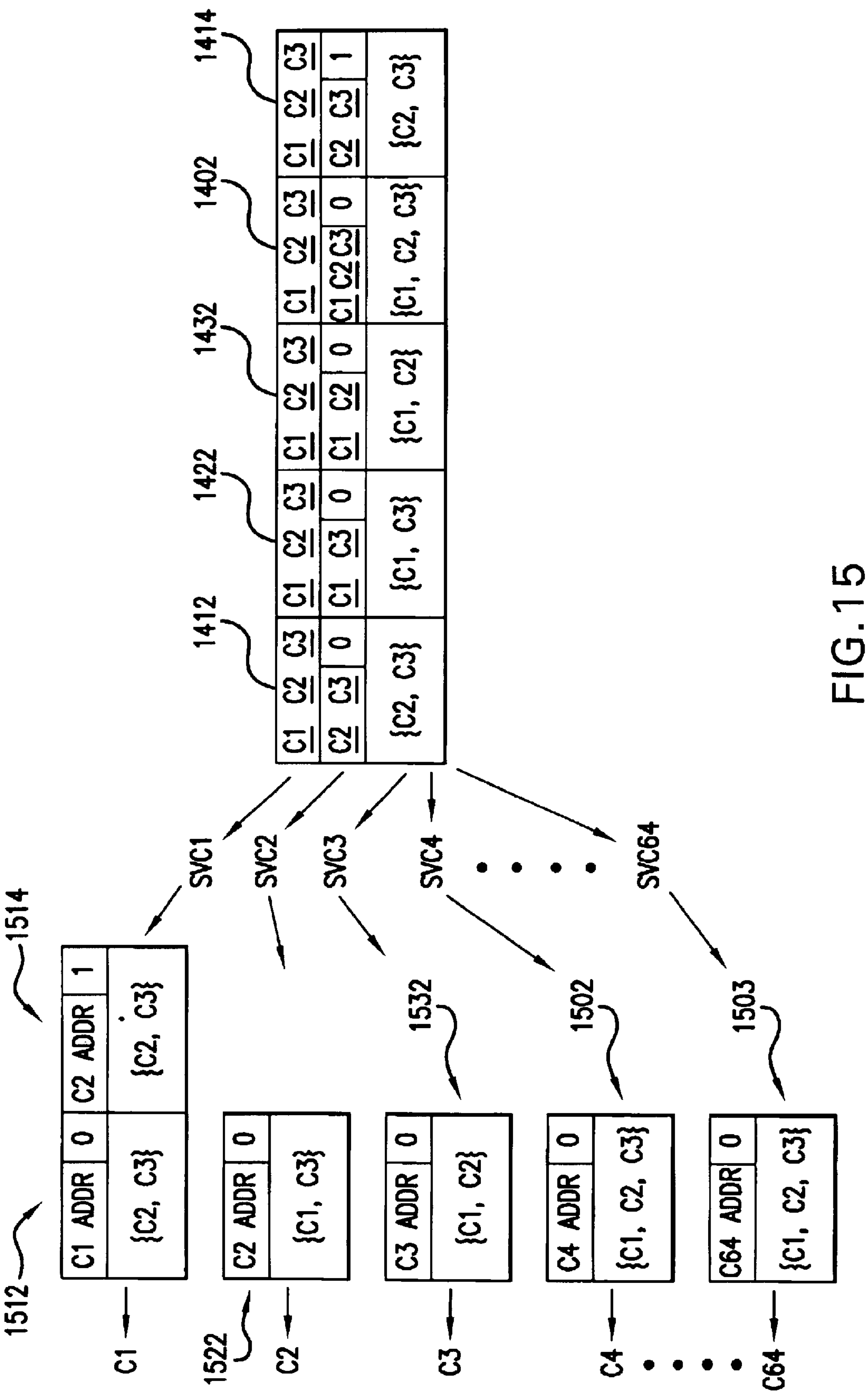
FIG. 15 is a diagram that illustrates example packet content after the packets of FIG. 14 have been multicasted and after they have been processed into IP packets to be sent to appropriate participants in a 64 participant conference call according to the present invention.

Outbound packet flow in distributed conference bridge 1000 is described further with respect to example packets in a 64-person conference call shown in FIGS. 14 and 15. In FIGS. 14 and 15, mixed audio content in a packet payload is denoted by a bracket surrounding the respective participants whose audio is mixed (e.g., {C1,C2,C3}). CID information in packet headers is denoted by underlining the respective active speaker participants (e.g., C1, C2, C3, etc.). Sequence information is simply shown by a sequence number 0, 1 etc.

In this example, there are 64 participants C1–C64 in a conference call of which three are identified as active speakers at a given time (C1–C3). Audio participants C4–C64 are considered passive and their audio is not mixed. Audio source 1040 generates one fully mixed audio stream FM having audio from all 3 active speakers (C1–C3). FIG. 14B shows two example internal packets 1402, 1404 generated by audio source 1040 during this conference call. Packets 1402, 1404 in stream FM have a packet header and payload. The payloads in packets 1402, 1404 each include mixed audio from each of the three active speakers C1–C3. Packets 1402, 1404 each include packet headers having TAS and IAS fields. The TAS field contains CIDs for the total three active speakers C1–C3. The IAS field contains CIDs for the active speakers C1–C3 whose content is actually mixed in the payload of the packet. Packet 1402, 1404 further include sequence information 0 and 1 respectively to indicate packet 1402 precedes packet 1404. Mixed audio from fully mixed stream FM is eventually sent to each of the 61 currently passive participants (C4–C64).

Three partially mixed audio streams PM1–PM3 are generated by audio source 1040. FIG. 14B shows two packets 1412, 1414 of first partially mixed stream PM1. Payloads in packets 1412 and 1414 contain mixed audio from speakers C2 and C3 but not speaker C1. Packets 1412, 1414 each include packet headers. The TAS field contains CIDs for the total three active speakers C1–C3. The TAS field contains CIDs for the two active speakers C2 and C3 whose content is actually mixed in the payload of the packet. Packet 1412, 1414 have sequence information 0 and 1 respectively to indicate packet 1412 precedes packet 1414. FIG. 14B shows two packets 1422, 1424 of second partially mixed stream PM2. Payloads in packets 1422 and 1424 contain mixed audio from speakers C1 and C3 but not speaker C2. Packets 1422, 1424 each include packet headers. The TAS field contains CIDs for the total three active speakers C1–C3. The IAS field contains CIDs for the two active speakers C1 and C3 whose content is actually mixed in the payload of the packet. Packets 1422, 1424 have sequence information 0 and 1 respectively to indicate packet 1422 precedes packet 1424. FIG. 14B further shows two packets 1432, 1434 of third partially mixed stream PM3. Payloads in packets 1432 and 1434 contain mixed audio from speakers C1 and C2 but not speaker C3. Packets 1432, 1434 each include packet headers. The TAS field contains CIDs for the total three active speakers C1–C3. The IAS field contains CIDs for the two active speakers C1 and C2 whose content is actually mixed in the payload of the packet. Packets 1432, 1434 have sequence information 0 and 1 respectively to indicate packet 1432 precedes packet 1434.

FIG. 15 is a diagram that illustrates example packet content after the packets of FIG. 14 have been multicasted and after they have been processed into IP packets to be sent to appropriate conference call participants according to the present invention. In particular, packets 1412, 1422, 1432, 1402, 1414 are shown as they are multicast across each of SVC1–SVC64 and arrive at NIC 1020. As described above with respect to step 1381, NIC 1020 determines for each SVC1–SVC64 which packets 1412, 1422, 1432, 1402, 1414 are appropriate to forward to a respective conference call participant C1–C64. Network packets (e.g. IP packets) are then generated by packet processor 1070 and sent to the respective conference call participant C1–C64.

As shown in FIG. 15, for SVC1, packets 1412 and 1414 are determined to be forwarded to C1 based on their packet headers. Packets 1412, 1414 have the CID of C1 in the TAS field but not the IAS field. Packets 1412 and 1414 are converted to network packets 1512 and 1514. Network packets 1512, 1514 include the IP address of C1 (C1ADDR) and the mixed audio from speakers C2 and C3 but not speaker C1. Packets 1512, 1514 have sequence information 0 and 1 respectively to indicate packet 1512 precedes packet 1514. For SVC2 (corresponding to conference call participant C2), packet 1422 is determined to be forwarded to C2. Packet 1422 has the CID of C2 in the TAS field but not the IAS field. Packet 1422 is converted to network packet 1522. Network packet 1522 includes the IP address of C2 (C2ADDR), sequence information 0, and the mixed audio from speakers C1 and C3 but not speaker C2. For SVC3 (corresponding to conference call participant C3), packet 1432 is determined to be forwarded to C3. Packet 1432 has the CID of C3 in the TAS field but not the IAS field. Packet 1432 is converted to network packet 1532. Network packet 1532 includes the IP address of C3 (C3ADDR), sequence information 0, and the mixed audio from speakers C1 and C2 but not speaker C3. For SVC4 (corresponding to conference call participant C4), packet 1402 is determined to be forwarded to C4. Packet 1402 does not have the CID of C4 in the TAS field and the TAS and IAS fields are identical indicating a fully-mixed stream. Packet 1402 is converted to network packet 1502. Network packet 1502 includes the IP address of C4 (C4ADDR), sequence information 0, and the mixed audio from all of the active speakers C1, C2, and C3. Each of the other passive participants C5–C64 receive similar packets. For example, for SVC64 (corresponding to conference call participant C64), packet 1402 is determined to be forwarded to C64. Packet 1402 is converted to network packet 1503. Network packet 1503 includes the IP address of C64 (C64ADDR), sequence information 0, and the mixed audio from all of the active speakers C1, C2, and C3.

D. Control Logic and Additional Embodiments

Functionality described above with respect to the operation of conference bridge 1000 (including conference call agent 1010, NIC 1020, switch 1030, audio source 1040, and multi-caster 1050) can be implemented in control logic. Such control logic can be implemented in software, firmware, hardware or any combination thereof.

In one embodiment, distributed conference bridge 1000 is implemented in a media server such as media server 202. In one embodiment, distributed conference bridge 1000 is implemented in audio processing platform 230. Conference call agent 1010 is part of call control and audio feature manager 302. NIC 306 carries out the network interface functions of NIC 1020 and packet processors 307 carry out the function of packet processor 1070. Switch 304 is replaced with switch 1030 and multicaster 1050. Any of audio sources 308 can carry out the function of audio source 1040.

XI. Conclusion

While specific embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A media platform for providing media services in a voice over data call over a network, comprising:

a resource manager that manages resources used to support the media services; and an audio processing platform that manages the call and the media services provided in the call, the audio processing platform including:

a network interface having a set of packet processors that process packets of audio data entering and exiting the media platform in the call being handled, a set of audio processors that process the audio data according to the media services provided in the call, wherein each audio processor has at least one internal audio source and a switch that noiselessly switches a plurality of internal streams of packets having audio data sent between a plurality of internal audio sources in one or more audio processors and packet processors in the network interface, wherein the switch further delivers the plurality of internal streams of packets to the network interface which controls the transmission of synchronous packets carrying audio from the plurality of internal streams in the call over the network.

2. The media platform according to claim 1, wherein the audio processing platform further comprises a call control and audio feature manager that controls resources and media services provided to the call processed by the audio processors.

3. The media platform according to claim 2, wherein the call control and audio feature manager includes:

a call signaling manager;

system manager;

connection manager; and feature controller.

4. The media platform according to claim 2, wherein the audio processing platform comprises a shelf controller card.

5. The media platform according to claim 1, further comprising:

a set of ports coupled to the network; and wherein the network interface further comprises, for each packet processor, a respective controller and forwarding information table.

6. The media platform according to claim 1, wherein the switch comprises a packet switch.

7. The media platform according to claim 1, further comprising a cell layer that combines the packets of audio data into cells of audio, and wherein the switch comprises a cell switch that switches the cells.

8. The media platform according to claim 1, wherein each audio processor comprises a digital signal processor.

9. The media platform according to claim 1, wherein each audio processor comprises a plurality of card processors coupled to a plurality of digital signal processors.

10. The media platform according to claim 1, wherein for at least one ingress audio stream, each packet processor receives IP packets with RTP information from the network and converts the IP packets to internal packets, each internal packet having a payload and header.

11. The media platform according to claim 10, wherein each audio processor processes internal packets.

12. The media platform according to claim 1, wherein for egress audio streams, each packet processor receives internal packets and generates IP packets with RTP information to be sent over the network.

13. A media platform for providing media services in a voice over data call over a network, comprising:

means for managing resources used to support the media services;

means for interfacing with a network, said interface means including means for processing packets of audio data entering and exiting the media platform in calls being handled;

means for processing the audio data according to the media services provided in the call; and means for noiselessly switching packets of audio data sent between the means for processing the audio data and the means for interfacing with the network, wherein the means for noiselessly switching packets of audio includes means for using switched virtual circuits to noiselessly switch audio streams between the means for processing the audio data and the means for interfacing with the network.

14. A scalable audio processing platform that manages a voice over the Internet call and media services provided in the call, the platform including:

a network interface having a set of packet processors that process packets of audio data entering and exiting the platform in the call being handled;

a set of audio processors that process the audio data according to the media services provided in the call, wherein each audio processor has at least one internal audio source and a switch coupled between the network interface and the set of audio processors that noiselessly switches a plurality of internal streams of packets having audio data sent between a plurality of internal audio sources in one or more audio processors and packet processors in the network interface, wherein the switch further delivers the plurality of internal streams of packets to the network interface which controls the transmission of synchronous packets carrying audio from the plurality of internal streams in the call over the network.

15. A method for providing media services in a voice over data call on an egress channel over a network, comprising:

managing resources used to support at least one media service provided to the voice over the Internet call;

processing audio data in a first audio stream generated by a first internal audio source and a second audio stream generated by a first internal audio source including convening audio data to internal packets in the first and second audio streams;

assigning a first switched virtual circuit between the first internal audio source and the network interface controller associated with the egress channel and a second switched virtual circuit between the second internal audio source and the network interface controller;

noiselessly switching the internal packets of audio data in the first audio stream over the first virtual circuit and internal packets of audio data in the second audio stream over the second virtual circuit; and processing the internal packets of audio data in the first and second audio streams to provide at least one media service in the call.

* * * * *

UNITED STATES PATENT AND TRADEMARK OFFICE

CERTIFICATE OF CORRECTION

PATENT NO. : 6,947,417 B2
DATED : September 20, 2005
INVENTOR(S) : Laursen et al.

It is certified that error appears in the above-identified patent and that said Letters Patent is hereby corrected as shown below:

Column 30,
Line 15, replace “convening audio data to internal packets” with -- converting audio data to internal packets --.

Signed and Sealed this

Seventh Day of February, 2006

JON W. DUDAS
*Director of the United States Patent and Trademark Office*